United States Patent [19]
Smart et al.

[11] Patent Number: 5,845,243
[45] Date of Patent: Dec. 1, 1998

[54] METHOD AND APPARATUS FOR WAVELET BASED DATA COMPRESSION HAVING ADAPTIVE BIT RATE CONTROL FOR COMPRESSION OF AUDIO INFORMATION

[75] Inventors: Kevin Smart, Bountiful; Jiankan J. Yang, Murray, both of Utah

[73] Assignee: U.S. Robotics Mobile Communications Corp., Salt Lake City, Utah

[21] Appl. No.: 794,121

[22] Filed: Feb. 3, 1997

Related U.S. Application Data

[63] Continuation-in-part of Ser. No. 543,205, Oct. 13, 1995.
[51] Int. Cl.[6] .......................................... G10L 7/00
[52] U.S. Cl. .............................. 704/230; 704/229
[58] Field of Search ................... 704/229, 230, 704/203, 205, 500, 501, 504, 200, 201, 224

[56] References Cited

U.S. PATENT DOCUMENTS

| | | | |
|---|---|---|---|
| 4,394,774 | 7/1983 | Widergreen et al. | 382/250 |
| 4,964,166 | 10/1990 | Wilson | 704/229 |
| 5,311,561 | 5/1994 | Akagiri | 375/122 |
| 5,388,181 | 2/1995 | Anderson et al. | 395/212 |
| 5,388,182 | 2/1995 | Benedetto et al. | 395/2.14 |
| 5,394,508 | 2/1995 | Lim | 395/2.38 |
| 5,408,580 | 4/1995 | Stautner et al. | 395/2.14 |
| 5,412,741 | 5/1995 | Shapiro | 382/232 |
| 5,430,690 | 7/1995 | Abel | 367/135 |
| 5,453,945 | 9/1995 | Tucker et al. | 364/725 |
| 5,610,657 | 3/1997 | Zhang | 348/415 |

OTHER PUBLICATIONS

Nass, *Competitive–Video Compression–Decompression Schemes Forge Ahead*, Electronic Design 1994.

Mandridake et al., *Joint Wavelet Transform and Vector Quantization for Speech Coding*, IEEE, vol. 1, pp. 699–702, May 1993.

Kinsner et al., *Speech and Image Signal Compression with Wavelets*, IEEE Conference Paper, 1993.

Heegard et al., *High–Fidelity Audio Compression: Fractional–Band Wavelets*, IEEE 1992.

Goh et al., *Speech Coding by Wavelet Representation of Residual Signal*, IEEE 1994.

Sinha et al., *Low Bit Rate Transparent Audio Compression Using a Dynamic Dictionary and Optimized Wavelets*, IEEE, vol. 1, pp. 197–200, 1993.

Scholl et al., *Audio Signal Compression with Circular Wavelet Packets*, SPIE, vol. 2303.

Tewfik et al., *Enhanced Wavelet Based Audio Coder*, IEEE 1993.

Ali et al., *Real Time Implementation of Second Generation of Audio Multilevel Information Coding*, SPIE, vol. 2242, 1994.

M. Purat and P. Noll, *Audio Coding With A Dynamic Wavelet Packet Decomposition Based on Frequency–Varying Modulated Lapped Transforms*, Institute for Telecommunications, Technical University of Berlin, pp. 1021–1024, IEEE 1996.

S. B. Deriche, *Audio Coding Using The Wavelet Packet Transform and A Combined Scalar–Vector Quantization*, School of Electrical and Electronic Systems Engineering, Queensland University of Technology, pp. 1041–1044, IEEE 1996.

(List continued on next page.)

*Primary Examiner*—Richemond Dorvil
*Attorney, Agent, or Firm*—Workman, Nydegger & Seeley

[57] ABSTRACT

The compression method utilizes a combination of both lossy and lossless compression to achieve significant compression while retaining very high subjective quality of the reconstructed or decompressed signal. Methods and apparatus for compression and decompression of digital audio data are provided. In one preferred embodiment, the compression method or apparatus employs an approximation of a psychoacoustic model for wavelet packet decomposition and has a bit rate control feedback loop particularly well suited to matching the output bit rate of the data compressor to the bandwidth capacity of a communication channel.

65 Claims, 11 Drawing Sheets

OTHER PUBLICATIONS

J. Princen and J. D. Johnston, *Audio Coding With Signal Adaptive Filterbanks,* AT&T Bell Laboratories, pp. 3071–3074, IEEE 1995.

D. Pan, *A Tutorial On MPEG/Audio Compression,* Motorola, pp. 60–74, IEEE MultiMedia, Summer 1995.

M. Black and M. Zeytinoğlu, *Computionally Efficient Wavelet Packet Coding of Wide–Band Stero Audio Signals,* pp. 3075–3078, IEEE 1995.

K. Brandenburg and G. Stoll, *ISO–MPEG–1 Audio: A Generic Standard For Coding Of High–Quality Digital Audio,* J. Audio Eng. Soc., vol. 42, No. 10, pp. 780–792. Oct. 1994.

N. Jayant, J. Johnston, and R. Safranek, *Signal Compression Based On Models Of Human Perception,* Proceedings of the IEEE, vol. 81, No. 10, pp. 1385–1421, Oct. 1993.

D. Sinha and A. Tewfik,*Low Bit Rate Transparent Audio Compression Using Adapted Wavelets,* IEEE Transactions on Signal Processing, vol. 41, No. 12, pp. 3463–3479, Dec. 1993.

K. Ferens and W. Kinsner,*Adaptive Wavelet Subband and Coding for Music Compression,* p. 490, IEEE 1995.

METHOD AND APPARATUS FOR WAVELET BASED DATA COMPRESSION HAVING ADAPTIVE BIT RATE CONTROL FOR COMPRESSION OF AUDIO INFORMATION

RELATED APPLICATION INFORMATION

This application is a continuation-in-part of U.S. patent application Ser. No. 08/543,205 filed on Oct. 13, 1995.

BACKGROUND OF THE INVENTION

1. The Field of the Invention

This invention relates to lossy (as opposed to lossless) compression schemes using wavelet transformations to concentrate the relevant signal information and thereby provide opportunities for compression. Furthermore, this invention relates to compression methods that are adapted for use in real time transmission applications where a low data bit rate is desirable along with reduced hardware processing requirements.

2. Present State of the Art

A variety of schemes exist for the compression of data representing audio, visual, or other information. There are numerous and different constraints, depending upon the nature of the data and the context of the compression, that influence the optimal compression method for a given application. For example, compression of computer files for long term storage would have constraints different than continuous transmission of compressed signal information representing real time audio or image data.

Compression schemes used for computer data files having information that ultimately must be used by the computer (e.g. a file for a word processing program) must retain all the information of the file in order to create an exact copy upon decompression. An error of even one bit will totally corrupt the file. On the other hand compression schemes used for information that is ultimately discernable by human senses can eliminate some of the information in the original signal since the human senses have finite perception capabilities.

The nature of human sensual perception has been utilized advantageously in lossy compression since it is only necessary to recreate (decompress) a signal to the degree necessary to convince the human senses to a required subjective quality rather than to perfectly recreate the signal. There are even applications where the reproduced signal may suffer a perceptible degradation in quality but still be sufficient for the desired application.

Multimedia computing utilizes a variety of visual and auditory information in computing applications. There exists a need in many instances to communicate multimedia information with or without computer data information over telephone lines using ordinary modems or other channels typically associated with computer data information. One example is to transmit voice or other sound signal information with data over a modem. This would allow one phone line to accommodate conversation between the users while data is simultaneously transmitted between them. This is commonly known as Simultaneous Voice and Data (SVD) and provides the framework for collaborative computing. Another example would be to communicate sound information over a computer network, utilizing the network data communication channel normally associated with computer data information to carry voice and other sound information in real time. Finally, large scale networks such as the internet that utilize a variety of computer data channels are yet another example where real time sound signal information requiring a low data bit rate would find application.

The internet provides interesting possibilities for such an application because of its widespread, even worldwide use. It is desirable to communicate sound information as well as computer data information over a common data channel at computational rates that can be accommodated by the current installed base of computer hardware or at least a substantial portion of it.

The nature of real time sound compression, transmission, and decompression provides a number of important constraints that must be addressed in any successful compression scheme tailored to this application. Namely, there is a limited data bit rate that can be utilized, limited computational resources to process the continuous nature of a constant signal such as real time sound, and a requirement for reasonable reproduction of the signal in both perceptible quality and timeliness.

Throughout this application, the continuous signal to be compressed and decompressed will be expressed as audio data. Typically, compressed sound data according to the field of this invention is eventually transmitted over digital transmission media such as network communications lines, public phone lines, microwave links, etc. or hybrid combinations. These data communication channels have characteristics and limits to the amount of data that can be transmitted (data transmission rates). Real time transmissions require relatively large amounts of data to maintain a continuous analog signal that is recreated in real time.

Furthermore, any given data channel may be subdivided into a variety of channels for carrying distinct sound signals. The varying degrees of compression due to the characteristics of actual sound signals may advantageously be utilized to increase total multiple signal throughput while maintaining acceptable reproduction quality.

Referring now to the example of public telephone lines, the highest data bit rate that the public phone lines can reliably handle is estimated at 34 kbps. The currently available modems operating at 14.4 kbps and 28.8 kbps are effectively pushing near these physical limits. Of this bandwidth amount, only a portion can be allocated to a continuous signal such as speech while allowing simultaneous data transmission at acceptable rates. A compression scheme should allow dynamic adjustment of the allocated bandwidth dedicated to continuous signals. However, to date, there have been no compression schemes that allow such dynamic adjustments in a manner which maximizes the use of available communication bandwidth to transmit both data and high quality audio information.

When the bandwidth available for transmission is relatively fixed, bit rates necessary to transmit compressed sound data at acceptable reproduction levels and timing are primarily determined by the nature of the sound data itself. For example, conversational speech will have many pauses where very high compression can take place while music would have less of such dead space.

Because many modems are already in existence running on host processors, it is desirable to run a compression scheme utilizing computational resources of the host processor if possible. While newer modems may contain dedicated assistance hardware, this would eliminate a sizable number of potential users from being able to participate in collaborative computing allowed by an appropriate compression scheme. Many compression schemes in use today are not capable of running in real time on standard computer hardware. These compression schemes generally use very fast general purpose or special purpose computer hardware to compress data which will be transferred at a later time.

Even in the best of situations, where fast personal computers are used, there can be a significant time delay in the compression process. Real time or very near real time compression is required to transmit a continuous audio signal so that decompression and reconstruction of the signal can occur in a timely manner. If real time, or very near real time compression is not achieved, "live" transmission of a continuous audio signal cannot occur effectively.

It would, therefore, represent an advancement in the art to provide a compression scheme which significantly reduced the computational or processing power required to compress an audio signal so that real time or very near real time compression can be achieved with standard personal computer hardware. While current decompression schemes generally require less processing power than current compression schemes, similar problems still exist.

One sound compression technique that addresses the requirement for a low data bit transmission rate while providing acceptable reproduction quality of human speech is Linear Predictive Coding (LPC). This is a mathematical model of the human vocal system to anticipate an entire sound based on a fragment of the sound. Though the data bit rate is minimal and sound quality is reasonable for pure speech, it is compute intensive and requires substantial latency to compress human speech. Other quality drawbacks include deteriorated performance for sound other than human speech and significantly degraded performance if human speech is mixed with background noise or other voices.

It is known to use wavelet transforms to compress speech and image data. Many schemes concentrate on encoding residual signals leftover after some other coding scheme, such as LPC, has already encoded the majority of the signal. Typically, sampled sound data is transformed into the wavelet domain where methods are used to eliminate non-necessary coefficients. Finally, the coefficients are quantized and encoded using entropy encoding. Reversing the process provides the decompression side of the scheme. Various improvements have been made according to the situation to this basic model that utilize sophisticated vector quantization methods, adaptive wavelet transforms, and tree encoding. These improvements typically come at the expense of processing power.

Others have optimized the wavelet transform to frequency bands of particular interest. This provides more coefficients in the desired regions while leaving less resolution in non-critical regions.

A main factor in increasing compression ratios for any wavelet based scheme is to quickly and efficiently reduce the coefficients based on a number of criteria. Many have utilized the psychoacoustic model to help determine which coefficients to eliminate. For example, there are certain small coefficients that represent information that is not detectable by human hearing. Also, it is known to reduce coefficients due to perceptual masking of sounds related in frequency. For example, a high energy sound in one frequency will tend to mask from perceptible human hearing the sounds of lesser energy at nearby frequencies. Again, some techniques require significant compute resources to perform these forms of coefficient reduction.

When coefficients are identified for reduction (elimination) they are set to a known value, usually null. Coefficient location within the frame, even if null, is still important for accurate recreation of the signal. As the null coefficients mount in numbers, there are many strings of contiguous null coefficients which lend themselves to Run Length Encoding (RLE) as has been exploited by others. The more coefficients that are eliminated, the higher the ultimate compression ratio since RLE will provide very high compression on the contiguous strings of null coefficients.

Current wavelet based schemes, however, still suffer from many drawbacks. Early attempts at using wavelet based encoding methods used performance measures such as data signal to noise ratio (SNR). These attempts eliminated wavelet coefficients until this measure began to suffer degradation. Unfortunately, the resulting speech was of such poor quality that many concluded that wavelet based compression was impractical for audio information. Although later schemes provided some improvements, audio quality was still relatively poor. This led many to combine wavelet based compression with some other form of compression such as LPC. These attempts to overcome the limitations of both methods by taking advantage of the strengths of both techniques however require a large amount of processing power.

Thus, it appears that there exists no compression scheme that can run in real time or near real time on conventional personal computer hardware and provide substantial audio data. Furthermore there does not currently exist compression schemes which work well with a wide variety of audio data while still preserving the subjective quality of the audio data. There also does not exist any compression scheme which can adapt the compression ratio achieved in order to match the existing transmission capability at a communication channel. Finally, there exists no compression scheme which can adapt the compression ratio dynamically to continue to match the transmission capability of a communication channel when that capability is a time varying quantity which fluctuates over a fairly short period of time.

SUMMARY AND OBJECTS OF THE INVENTION

It is an object of this invention to provide a method of compressing signal information for real time transmission and decompression at low data bit rates and low processing requirements while maintaining high quality of the decompressed signal information.

It is a further object of this invention to reduce wavelet domain coefficients representing a signal quickly and efficiently.

An advantage of this invention is equivalent compression at reduced processor requirements over the prior art.

A feature of the invention is to remove gain from a sampled wavelet band frame in the wavelet domain before quantizing the wavelet coefficients.

Another object of this invention is to allow simultaneous voice and data using ordinary modems at relatively low bit rates.

An advantage of this invention is to detect the data bit rate available for compressed signal transmission.

Another advantage of this invention is to dynamically adjust the compression variables in order to match a given available bit rate.

Another feature is to take advantage of delays, pauses, and other characteristics of sound information to smooth out processing intensive peaks while keeping within an acceptable lag or latency time.

Yet another feature of this invention is to use feedback principles to continuously update the number of coefficients to be eliminated in order to meet the allowable date bit rate requirements.

Yet another object of this invention is to provide a compression scheme to allow real time audio signal transmission over traditionally data-only digital networks.

A further object of this invention is to provide high quality audio data transmission by adaptively trading off the impact of various error sources so as to minimize perceptible distortion at a fixed bit rate.

A still further feature of this invention is to provide adaptive bit rate control which balances the level of quantization noise and the number of coefficients eliminated to minimize perceptible distortion at a fixed bit rate.

Additional objects and advantages of the invention will be set forth in the description which follows, and in part will be obvious from the description, or maybe learned by the practice of the invention. The objects and advantages of the invention maybe realized and obtained by means of the instruments and combinations particularly pointed out in the appended claims.

To achieve the foregoing objects, and in accordance with the invention as embodied and broadly described herein a method and apparatus for wavelet based compressing and decompressing signal information having adaptive bit rate control is provided. The invention can be embodied in an optimal mix of compression technologies to achieve real time full duplex simultaneous audio and data transmission through a personal computer modem utilizing the host computer systems as the signal processor to compress and decompress the audio signal. The invention can also be embodied to carry sound information over channels typically associated with data only such as computer modem communications channels.

Throughout this specification, reference will be made to a signal corresponding to sound. The modeling of the human sensory organs is used in arriving at higher compression ratios, higher effective transmission rates, or more computationally efficient compression. Psychoacoustic models are used to model human hearing traits.

Throughout this application, the data channel will be illustrated as a phone line between two personal computers having modems. The processing for compression will be the host personal computer processor. These are not intended to be limiting since those skilled in the art will see that processing could advantageously take place on specialized hardware should it be available or the data channel could be another form of linkage such as two personal computers communicating through Ethernet adapter cards over Ethernet cable.

The invention comprises a method of compressing and decompressing data in real time with lean processor requirements. A conceptual block diagram is shown in FIG. 2. An analog sound signal is digitally sampled at a desired rate and the samples are typically arranged in a data frame for compression. Sampling rates usually vary between 8 k s/sec to 44.1 k s/sec at a normal resolution of 8 or 16 bits per sample of unsigned integers although the present invention is independent of sample rate and can be used with any sampled data. The sampling rate is determined as a function of desired signal quality of the decompressed audio signal. For example, speech requires a lower sampling rate and resolution than accurate reproduction of music which may require higher sampling rates and resolution. The data frame size is usually chosen between 32 and 4096 samples although any data frame size can be used.

The sampled data in the frame is converted from unsigned integer data into floating point data and scaled with the values falling between −1.0 and +1.0 Although not strictly necessary, the scaling allows for a consistent implementation regardless of the specific details of the input data. In other words, by scaling the data between −1.0 and +1.0 the internal workings of the compressor and the values used in various parts of the compressor remain independent of the specific sample format of the input data The samples are then transformed into the wavelet domain using a 12 tap Daubechies (hereinafter Daubechies 12) wavelet filter, although any wavelet filter can be used in the present invention. Some embodiments may be optimized to particular frequency bands of interest or providing more detail in some frequency ranges than others according to the needs of the application. Presently, however, it is preferred to use a standard decomposition tree structure in the wavelet transform that closely mimics the critical bands of the psychoacoustic model. Thus, the individual wavelet bands of the wavelet transform are the critical bands of a psychoacoustic model.

The wavelet domain representation of the data frame is in the form of wavelet coefficients. Compression is achieved by a series of compression operations on each individual wavelet band. Operating on a per band basis allows coefficients in less important bands to be eliminated when higher compression ratios are desired. A bit rate control function is used to ensure the average bit rate is set at a desired level. Compression is achieved through a combination of eliminating coefficients in less critical bands, selecting an optimal number of bits for quantizing the remaining coefficients, and entropy encoding the quantized coefficients.

After the data has been transformed into the wavelet domain each wavelet band is examined to determine which wavelet bands can be eliminated without effecting the quality of the signal. When a wavelet band is eliminated, no further processing is performed on that band. Such an approach conserves processing resources for compression of more important wavelet bands.

The main focus of wavelet band reduction is to eliminate enough coefficients to meet the desired allowable data bit rate while maintaining adequate representation of the signal. Information of the allowed data bit rate at a given point in time is used to calculate a parameter used to determine the wavelet bands that must be eliminated in order to meet the desired data bit rate. In one embodiment, this is constantly or dynamically adjusted and will depend on a number of factors including the number of bits sent in the previous data frame. In one embodiment, the bit rate control aspect of the invention balances the fraction of coefficients eliminated and the number of quantization bits used to represent wavelet coefficients in order to minimize perceptible distortion at a fixed bit rate.

The allowable bit rate from the compressor may be a function of many factors. In some applications, only a few or one of these factors may influence the bit rate. In others, many factors may influence the bit rate. Some factors include the bandwidth available for use, data waiting to be transmitted and backed up processing of the data frame. The allowable data bit rate value may fluctuate depending on the nature of the actual data compressed, processing interruptions, latency constraints, etc. but may also be fixed in some environments.

In one embodiment, a bit rate control aspect is provided. The bit rate control aspect is used to match the bit rate from the compressor to the allowable bit rate. The bit rate control aspect uses a setpoint which is established as the desired data bit rate and an error value which is calculated based on the actual output bits from the previous frame in comparison with the desired data bit rate. The error value is used to adjust the number of wavelet bands that are eliminated and/or the number of quantization bits used to quantize wavelet coefficients in order to maintain a bit rate generally at the setpoint value. In some embodiments the setpoint value is fixed and in other embodiments the setpoint value is a time varying quantity based on various factors such as the currently available communication bandwidth or data latency. To maximize total data throughput, the setpoint should be set to the maximum allowable data bit rate. This feedback loop keeps the bit rate within the capabilities of the transmission medium so that real time transmission of sound data may occur with little effective latency.

In one embodiment the gain is taken out of each individual wavelet band and stored in the output data frame. This is readily accomplished by dividing all wavelet coefficients in a particular wavelet band by a fixed gain value. In some embodiments this gain value may be the highest wavelet coefficient value in the wavelet band in terms of absolute magnitude. In other embodiments, the gain is a filtered estimate of the highest wavelet coefficient in the wavelet band in terms of absolute magnitude. By removing the gain, the remaining signal is better suited for accurate quantization. Furthermore, such a scheme provides a benefit in the entropy encoding block. When the gain is a filtered estimate, changes in gain between signals is moderated to reduce perceptible distortion of the signal and to take advantage of psychoacoustic masking through small signal suppression. The gain may be clipped between a maximum value and a minimum value to eliminate conditions that cause significant distortion in the signal.

A masking threshold is calculated for each wavelet band. Masking is a perceptual property of the human auditory system that occurs whenever strong audio signals render neighboring weaker audio signals imperceptible. The masking threshold for each wavelet band is used to help determine the number of symbols needed to represent the wavelet coefficient in order to keep the quantization noise to acceptable levels.

After normalization of all wavelet coefficients in a particular band by the gain, the wavelet coefficients are quantized using a fixed number of bits to represent each wavelet coefficient. The number of bits used to quantize the wavelet coefficients is calculated from the number of symbols previously calculated. In current embodiments, a minimum number of symbols required for perceptually lossless quantization of wavelet coefficients is calculated as previously described. The number of symbols required is a function of the gain divided by the masking threshold. The assigned quantization bits are calculated from the number of symbols scaled by a factor to encourage the actual bit rate to converge on the desired bit rate. In certain embodiments, the coefficients are quantized linearly although other schemes are within the scope of the invention. The number of bits used to represent wavelet coefficients may also be based on the energy and/or entropy characteristics of the frame. High energy or entropy signals will need lower quantization resolution while highly concentrated signals (low entropy) and low energy signals will require higher quantization resolution. In some embodiments, the product of the entropy and energy characteristics is used to determine a quantization level (i.e. the number of bits to be used to quantize coefficient). In other embodiments, measures such as these represent but one input into a process that trades off various error sources to minimize perceptible distortion.

Quantization of the wavelet coefficients takes each coefficient and conceptually places it into an integer bin. The number of bins available, and hence the resolution of the quantized signal, is determined by the number of quantization bits selected. This number may be fixed or dynamic depending upon the embodiment.

After quantization, the output data frame is further compressed using various forms of entropy encoding. A wide variety of entropy encoding methods are suited to the present invention and both entropy encoding using fixed codebooks or entropy encoding using adaptive codebooks can be used with the present invention. Various factors, including the intended operating application environment, will influence the choice of entropy encoding. In one embodiment, two forms of statistical encoding are used, Run Length Encoding (RLE) to compress large numbers of contiguous null coefficients and multiple Huffman coding for encoding the constituent parts of the output data frame. Fixed or adaptive codebook Huffman coding may be utilized. Huffman encoding essentially assigns fewer numbers of bits to frequently occurring information and higher numbers of bits to less frequently occurring information to realize a net gain in total numbers of bits used.

The output data frame is created by assembling individually compressed wavelet bands into an output frame. Each of the compressed wavelet bands have the gain information, if separated out from the wavelet coefficients, and quantization level at the beginning. Both of these values are Huffman encoded using a gain codebook and quantization codebook respectively. In one embodiment, the quantization level for a particular wavelet band is used to select the proper codebook used to encode and decode the quantized wavelet coefficients. In such an embodiment, the wavelet coefficients are traversed in order and wavelet coefficients are encoded using the appropriate coefficient codebook for the designated quantization level. A codebook contains the relationship between actual bits to be put into the output data frame and corresponding values of the information to be encoded such as coefficients, gain, quantization level, and run lengths counts.

Prior to or during Huffman encoding, contiguous runs of null wavelet coefficients are run length encoded. The run length encoding produces at least a run length marker and a run length count. The run length marker is Huffman encoded like any wavelet coefficient while the run length count is encoded using a separate run length count codebook. After complete encoding, the encoded output data frame is sent through the digital data channel to be decompressed on the receiving side or stored for later retrieval and decompression.

Decompression is comparatively simple and requires somewhat less computational resources than compression. Essentially, many of the same steps used for compression are used in reverse order. These steps are to entropy decode each individual wavelet band in the encoded output data frame to obtain the wavelet coefficients of each wavelet band, multiply the gain information for that wavelet band back into the coefficients, transform the coefficients back into the time domain, take care of any residual scaling, and finally convert the data into integer sound samples to be reconstructed into audio or other signal information.

The quantization level at the beginning of each individual wavelet band in the encoded output data frame is entropy decoded using the quantization level codebook for that wavelet band. The decoded quantization level for that wavelet band determines which coefficient codebook to use for processing the coefficient portion of the encoded wavelet band should multiple coefficient codebooks be implemented.

It may be noted that adaptive entropy encoding implementations may include information such as the actual codebook or information to change the existing codebook used in decompression of the previous wavelet band or output data frame. Each coefficient encountered is placed in the reconstructed wavelet band using the appropriate coefficient codebook. When a run length marker is encountered, the length of contiguous null coefficients is decoded using the run length count codebook. The string of null coefficients is then recreated and placed in the reconstructed wavelet band.

After the coefficients have been entropy decoded, the gain value from the encoded wavelet band is decoded using the gain codebook and multiplied across all coefficient values. In this state, all reconstructed wavelet bands are assembled and inverse transformed from the wavelet domain back into the time domain. Embodiments using one of a plurality of wavelet transforms dependant on the actual nature of the data, can include information identifying the transform used in compression to ensure the identical transformation equation is selected for decompression.

The transformed coefficients are now rescaled back into digitally sampled data to be converted to an analog signal or stored. Decompression is complete at this point.

Additional objects and advantages of the invention will be set forth in the description which follows, and in part will be obvious from the description, or maybe learned by the practice of the invention. The objects and advantages of the invention maybe realized and obtained by means of the instruments and combinations particularly pointed out in the appended claims.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The current invention embraces within its scope both methods and apparatus for compressing digital audio data. Thus, the descriptions of the preferred embodiments which follow should be read to include both methods and apparatuses. With particular regard to the apparatuses involved, no particular limitation is envisioned. Thus, the apparatus may involve dedicated hardware including discrete components, shift registers, custom VLSI chips, and the like, as well as general purpose computer or digital signal processing hardware having a conventional arrangement including a processing unit, memory (volatile and/or nonvolatile), input devices, display devices, mass storage devices, and the like. From the description which follows, those skilled in the art will recognize that a variety of hardware and/or software configurations are suitable apparatus for practicing the disclosed invention.

Figure 1:
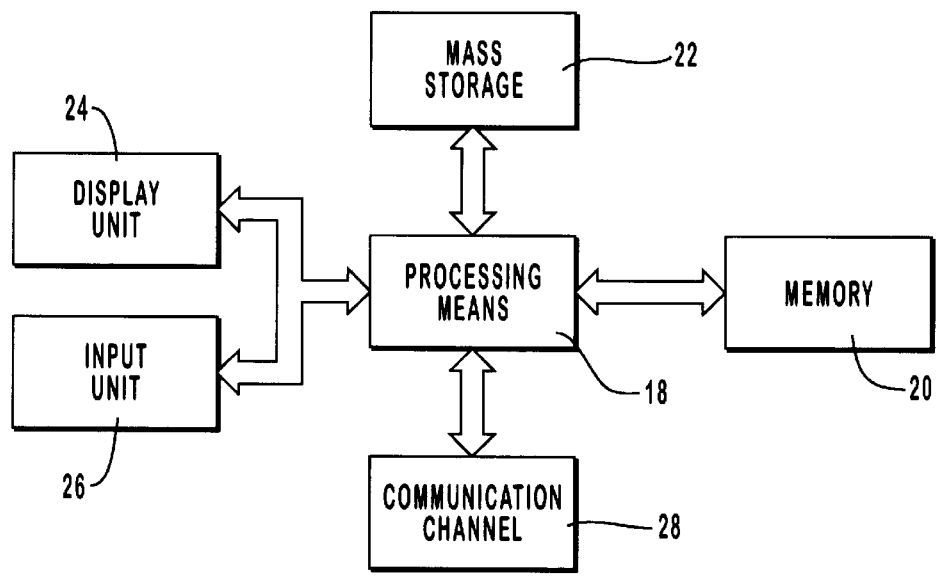
FIG. 1 is a high level block diagram showing an example apparatus structure.

By way of example, and not limitation, a suitable hardware apparatus is illustrated in FIG. 1. In FIG. 1, the apparatus comprises processing means 18. Processing means 18 preferably comprises a general purpose microprocessor like those commonly used in personal computers or workstation computers. Processing means 18 could, however, also comprise a digital signal processor, a specialized processor custom tailored to the inventive method disclosed herein, or any combination of a general purpose microprocessor, a digital signal processor, and a specialized processor.

Electrically connected to processing means 18 is memory 20. Memory 20 is preferably comprised of a combination of both volatile and non-volatile memory. Depending on the application, however, memory 20 may also comprise either solely volatile or solely non-volatile memory.

Processing means 18 is also electrically connected to mass storage 22. Mass storage 22 preferably comprises a combination of fixed and removable computer disk storage (either magnetic or optical) although the apparatus could be configured with only fixed computer disk storage or removable disk storage.

In order to interface with the outside world, the apparatus also comprises display unit 24, input unit 26, and communication channel 28. Display unit 24 and input unit 26 are for displaying information to a user and receiving input from a user respectively. Typical devices usually used to implement display unit 24 are audio speakers, monitors, plasma displays, LCD screens and the like. Typical devices used to implement input unit 26 include a microphone, a keyboard, a mouse, a touch pad, and the like.

Communication channel 28 represents communication through a computer network, land line telephone network, cellular telephone networks, and the like. In some instances, a modem (not shown) may be necessary to interface processing means 18 with communication channel 28. In such a situation, the modem usually resides between processing means 18 and communication channel 28. Furthermore, some embodiments are designed to be used without a communication channel such as when data is compressed and stored on mass storage 22 for later retrieval and decompression.

Computer useable medium having computer readable code means embedded or encoded thereon is also contemplated. In such an article of manufacture, the computer readable program code means will comprise various means for implementing the method disclosed herein. By way of example, and not limitation, suitable computer useable media include magnetic disks (both fixed and removable), optical disks, magnetic tape, volatile memory, nonvolatile memory, and the like. In these articles of manufacture the term "embedded therein" should be read to include the various methods of encoding computer readable program code means so they are contained on or in the computer usable media.

Figure 2:
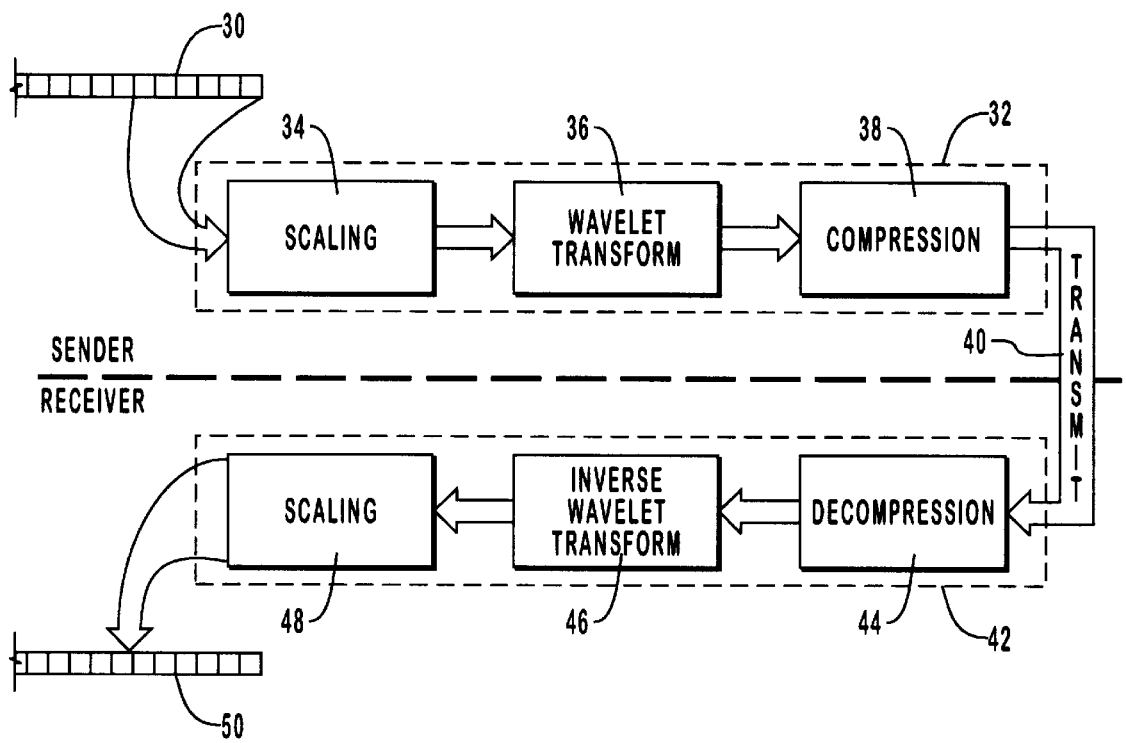
FIG. 2 is a high level block diagram of the compression and decompression process of the present invention.

Referring next to FIG. 2, a general overview of the present invention is illustrated. In FIG. 1, digital data, represented by input data stream 30, is input into data compressor 32. Data compressor 32 can either be configured to take input data stream 30 on a continual basis and process the data sample by sample or data compressor 32 can be configured to break input data stream 30 into individual data frames each having a fixed number of data samples. Currently, it is preferred that data compressor 32 be configured to break input data stream 30 into individual data frames each having a fixed number of data samples. Throughout this patent, this will be referred to as block processing. If data compressor 32 is configured to process the data samples without breaking data stream 30 into separate data frames, the patent will refer to that processing as stream or continuous processing.

Data compressor 32 performs three fundamental functions. The first function is to scale the input data. This function is illustrated in FIG. 2 by scaling block 34. Scaling is not strictly necessary and the primary function of scaling block 34 is to make processing easier within data compressor 32. By scaling the input data the implementation details of other blocks in data compressor 32 can remain fixed independent of the size and sample format of the audio data in input data stream 30. In other words, scaling provides a consistent interface to the remaining blocks in data compressor 32. Depending on the exact apparatus used to implement data compressor 32, however, scaling may also perform other highly important functions. Such functions include minimizing round-off error in the data as it is processed, minimizing the effect of fixed word size within the processing apparatus, allowing the use of fixed point processing rather than floating point processing, and the like.

After the input data is appropriately scaled, the next function of data compressor 32 is to perform a wavelet transform on the data. This function is illustrated in FIG. 2 by wavelet transform block 36. Wavelet transform block 36 converts the input data from the time domain to the wavelet domain. Thus wavelet transform block 36 is one example of means for performing a wavelet transform. Any wavelet transform can be used. It is, however, presently preferred to use a Daubechies 12 filter in the wavelet transform. The transform decomposition tree structures for wavelet packet transformations are chosen to closely approximate the critical bands of the psychoacoustic model.

The next function of data compressor 32 is to compress the wavelet coefficients. This is illustrated in FIG. 2 by compression block 38. Compression block 38 is designed to reduce the number of bits needed to represent the digital audio data. In order to achieve the performance desired in this invention, a combination of lossy and lossless compression is utilized. At all times in the compression process the quality of the reconstructed data is considered. Thus, trade-offs can be made between lossless and lossy compression in order to achieve a compact representation while minimizing distortion of the reconstructed output signal.

As more fully described hereafter, data compressor 32 is designed to operate on general digital audio data. Thus, in the construction of data compressor 32 no assumptions about the type of audio data were used. Thus, data compressor 32 will work equally well on a wide variety of audio data such as voice, monophonic music, stereo phonic music, and the like. Furthermore, data compressor 32 makes no assumptions about the sampling rate used to generate input data stream 30. Thus, the compression process is independent of sampling rate. A bit rate control scheme enables data compressor 32 to operate at virtually any desired bit rate level. Such a feature further extends the utility of data compressor 32.

Returning now to FIG. 2, after the wavelet coefficients have been compressed by compression block 38, the sender transmits the compressed data to a receiver. This is illustrated in FIG. 2 by transmit channel 40. In the alternative, rather than transmitting the compressed audio data, the sender may simply store the compressed audio data for later retrieval. The instant invention is equally applicable to audio data which is transmitted over a bandwidth limited channel and to compression of audio data for compact storage such as might be utilized in a multi-media application.

The decompression process proceeds in the reverse from the compression process just described. Returning now to FIG. 2, the compressed data which has been transmitted over transmit channel 40 or retrieved from a storage location is decompressed by data decompressor 42.

The first step in reconstructing the digital audio signal is to decompress the data. This is illustrated by decompression block 44. The purpose of decompression block 44 is to reverse the lossless compression performed by compression block 38. This decompression will result in reconstruction of a portion of the wavelet coefficients. Because compression block 38 uses a combination of lossless and lossy compression, decompression block 44 can only reverse the lossless compression. The information eliminated in the lossy compression is not recovered.

After the effects of the lossless compression have been reversed by decompression block 44, the next step is to perform an inverse wavelet transform. This is illustrated in FIG. 2 by inverse wavelet transform block 46. Inverse wavelet transform block 46 takes the recovered wavelet coefficients and transforms the data back into the time domain.

Once the data has been transformed back into the time domain, the sole remaining function of data decompressor 44 is to scale the data appropriately. This is illustrated in FIG. 2 by scaling block 48. Although the details of scaling block 48 are discussed more fully hereafter, one function of scaling block 48 is to ensure that the digital audio data is returned to the proper data sample length. For example, if input data stream 30 was comprised of 8 bit or 16 bit data samples, then scaling block 48 would return the time domain data to an 8 bit or 16 bit sample length.

Once the data has been appropriately scaled by scaling block 48, the data is then placed onto output data stream 50. Output data stream 50 thus represents the reconstruction of input data stream 30. The digital data can then be played using methods well known in the art.

Figure 3:
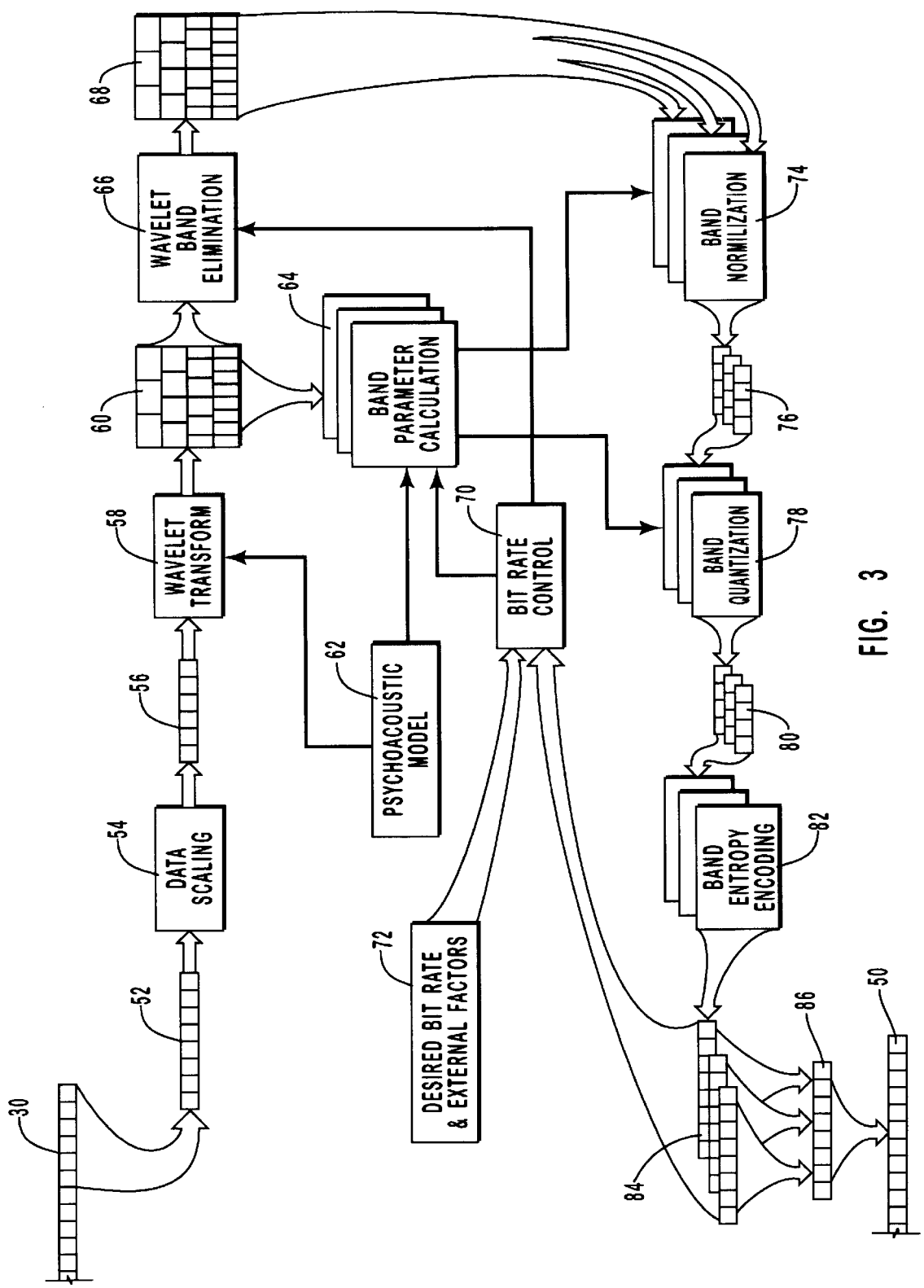
FIG. 3 is a more detailed block diagram of the compression process of the present invention.

Referring now to FIG. 3, a more detailed illustration of data compressor 32 is shown. The purpose of FIG. 3 is to present an overview of the basic compression process of one embodiment. Details of the compression process of FIG. 3 are then presented. In the particular embodiment illustrated in FIG. 3, block processing will be presumed. However, as previously discussed, stream processing may also be used.

In conjunction with the block processing, input data stream 30 is first broken down into a plurality of input data frames. The input data frames are then processed sequentially. In practice, this process is usually implemented by first extracting a data frame from the input data stream, processing the data frame, and then returning to the input data stream to extract another data frame. When block processing is used, the input data frames are usually of a fixed length having $2^n$ data samples. In practice, n is usually between 5 and 12 but could vary over a wide range. The length of the input data frame is not limited by the invention. The only limitation on the length of the input data frame is the capacity of the apparatus used to implement the invention. In the case of an apparatus constructed from discrete components such as shift registers, specialized VLSI chips, and the like, the primary limitation will be the internal length of the data paths such as the shift registers, the storage locations used to store temporary intermediate results, and the like. In the case of an apparatus comprised of a generalized central processing unit or specialized digital signal processing unit along with associated memory, the input data frame length is generally limited by the amount of volatile memory available to store intermediate results during the process. Furthermore, the upper limit on input data frame size will be a function of input data frame processing time and the application. Real time audio transmissions will require receiving compressed signal information often enough to reduce latency. This is most important in two-way voice conversation applications.

Returning now to FIG. 3, as previously indicated the first step is to take from input data stream 30 input data frame 52. This can be performed by a means for dividing data into data frames. When input data frame 52 is brought into the data compressor, the data is scaled so that the input data samples lie between −1.0 and +1.0. This step is illustrated by data scaling block 54, which represents an example of means for scaling data. Such a data scaling step is not strictly required, but in one embodiment it is performed for convenience in processing the data. One main advantage of scaling the data includes providing an interface to the remainder of the compressor that is independent of the sample format of the input data. As an example, most digital audio data comprises either 8 bit or 16 bit data samples. Digital audio data having 8 bits is generally stored in an unsigned fashion with values ranging between 0 and 255. Scaling such data requires removing the dc offset component by subtracting 128 and then dividing by 128. Digital data having 16 bits, on the other hand, is generally stored in a signed fashion with values ranging from −32768 to 32767. Thus to scale between −1.0 and +1.0, it is necessary to divide by 32768. In general, in order to scale such input data samples between −1.0 and +1.0, each input data sample is divided by $2^{j-1}$. Where j is the number of bits in each data sample. In some cases it is also necessary to remove dc offset values. In FIG. 3, such scaled data is represented by scaled input data frame 56.

As previously discussed, other advantages of scaling may include minimizing roundoff error, minimizing the effect of fixed word length in the data compressor, and allowing the use of fixed point processing rather than floating point processing. Scaling for these effects may require modification of the −1.0 to +1.0 scaling described above. However, scaling for these effects is known in the art and will not be discussed further.

After scaling, the scaled input data frame is transformed into the wavelet domain. This is illustrated in FIG. 3 by wavelet transform block 58. Any wavelet filter can be utilized to perform the wavelet transform. In one preferred embodiment a Daubechies 12 filter is used. It is also presently preferred that the wavelet transform use a decomposition tree structure designed to closely mimic the critical bands in a psychoacoustic model of the human ear.

Figure 4:
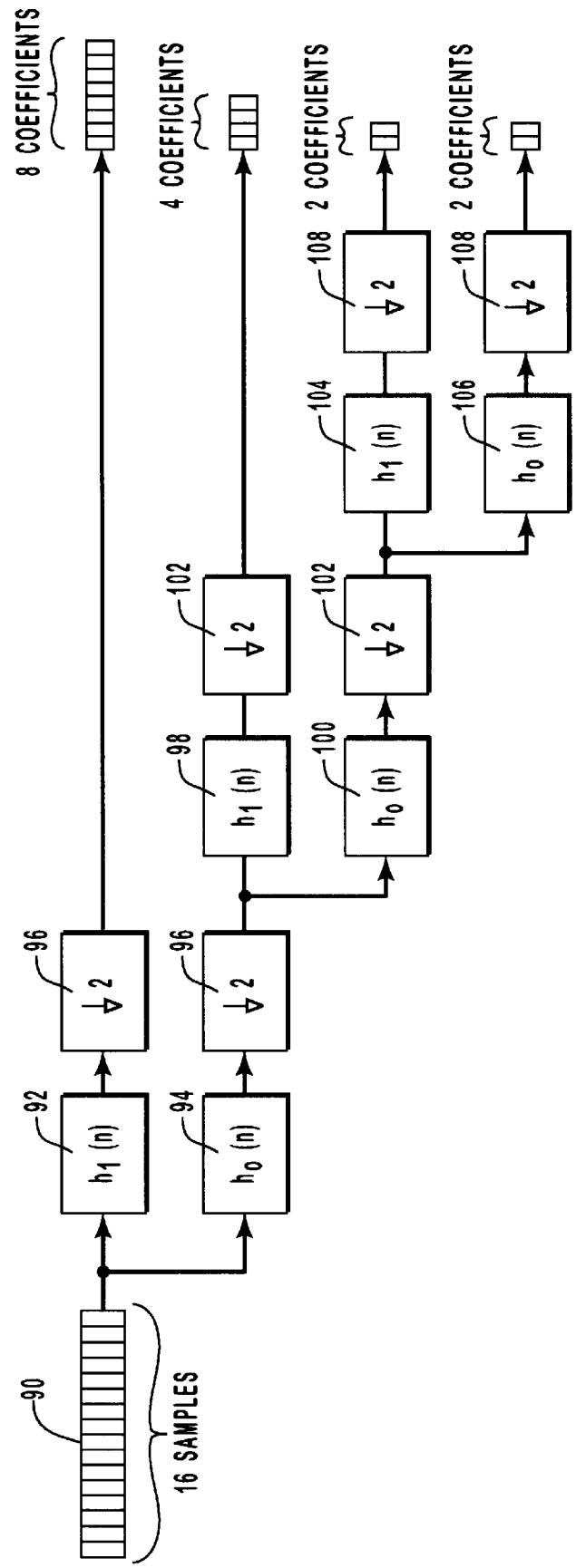
FIG. 4 is an illustrative example of a wavelet transform.

Referring next to FIG. 4, an example of a wavelet transform decomposition tree structure is illustrated. In general, a wavelet transform transforms time domain data into the wavelet domain. The wavelet transform can be visualized and implemented by a low pass/high pass filter pair which have been matched in a particular way. After filtering, the wavelet coefficients are typically decimated by a factor equal to the number of filter bands. In the case of a high pass/low pass filter pair, this results in decimation by 2. As those skilled in the art will recognize, decimation by 2 means that every other sample is discarded. The high pass/low pass filter decimation pair can be combined in a tree structure in order to break the signal information down into smaller and smaller wavelet bands. As discussed below, in one preferred embodiment, the low pass filter bands and high pass filter bands may be broken down and decimated to approximate the critical bands of the psychoacoustic model.

In the general illustrative example depicted in FIG. 4, the scaled input data frame is presumed to have 16 data samples. This is illustrated in FIG. 4 by scaled input data frame 90. In FIG. 4, the first stage high pass filter is illustrated by high pass filter 92. As illustrated in FIG. 4 filter high pass filter 92 has impulse response $h_1(n)$. The first stage low pass filter is illustrated by low pass filter 94 which has an impulse response of $h_0(n)$. After filtering by high pass filter 92 and low pass filter 94, the signal is decimated by 2. This is represented in FIG. 4 by decimation blocks 96.

After decimation, the output of the high pass wavelet band and the low pass wavelet band will each have 8 wavelet coefficients. As illustrated in FIG. 4, the low pass wavelet band is then cascaded with an identical filtering stage. This filtering stage is represented by high pass filter 98 and low pass filter 100. As illustrated in FIG. 4, high pass filter 98 has the impulse response $h_1(n)$. Low pass filter 100 has the impulse response $h_0(n)$. The output of high pass filter 98 and low pass filter 100 are again decimated by 2 as illustrated by decimation blocks 102. At this point, the output of high pass filter 98 and low pass filter 100 have 4 wavelet coefficients.

The process is repeated until the desired number of wavelet coefficients remain in the wavelet band. In FIG. 4, this is illustrated by high pass filter 104 and low pass filter 106. Again, this filtering stage is identical to the previous filtering stages so high pass filter 104 has an impulse response of $h_1(n)$ and low pass filter 106 has an impulse response of $h_0(n)$. Again, the outputs of high pass filter 104 and low pass filter 106 are decimated by 2 as illustrated by decimation blocks 108.

Figure 5:
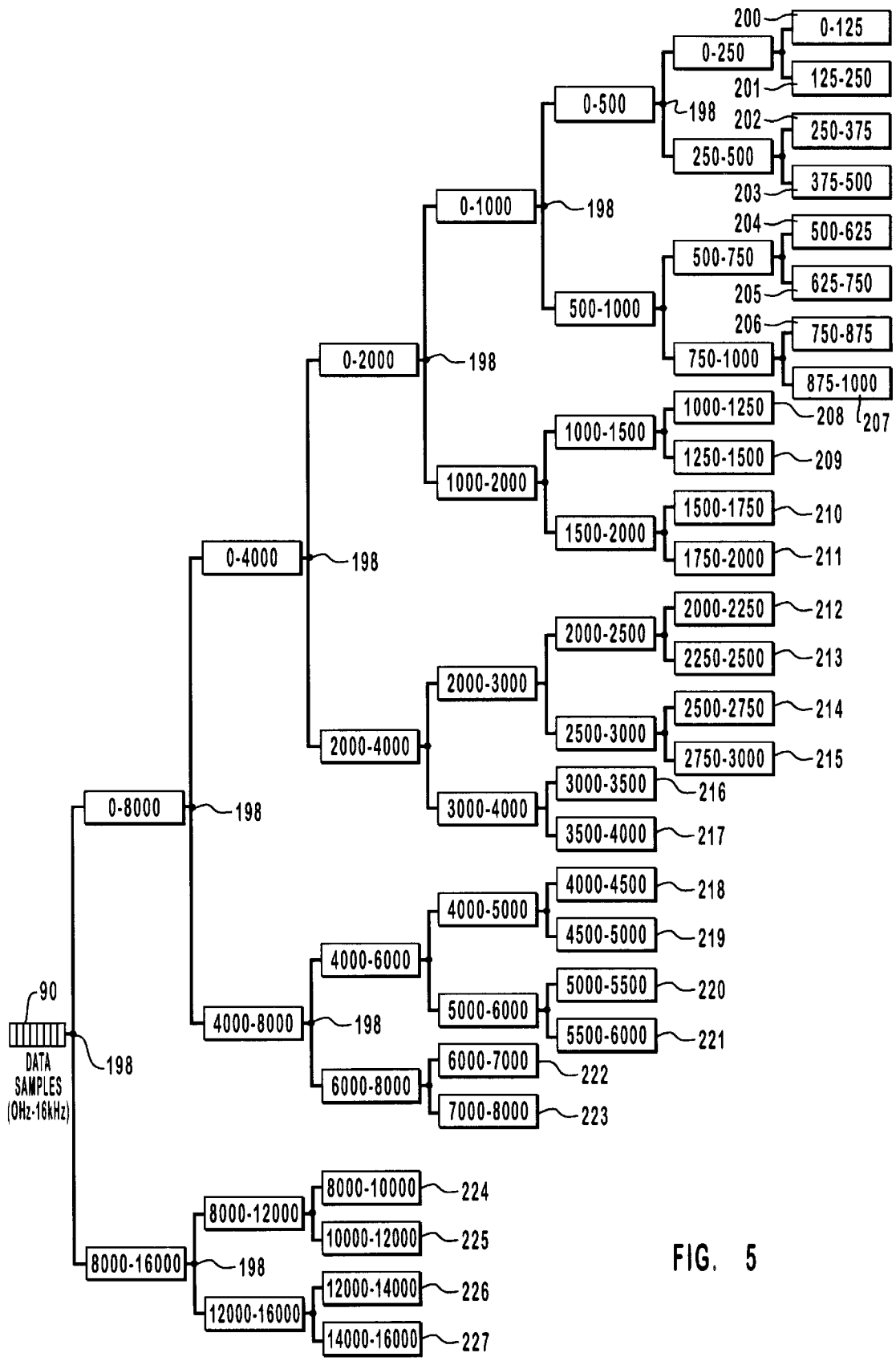
FIG. 5 is a wavelet packet decomposition tree structure designed to closely mimic the critical bands in a psychoacoustic model.

Referring next to FIG. 5, an example of a wavelet packet decomposition tree structure that approximates a psychoacoustic model is illustrated. In FIG. 5 the approximate frequency range is shown at each stage of the decomposition process. The wavelet packet decomposition tree disclosed in FIG. 5 closely mimics the critical bands in a psychoacoustic model of the human ear. In the present example, a wavelet packet decomposition tree structure is disclosed for 32 kHz sampling frequencies. Other sampling frequencies may be equally suitable such as 8 kHz and 16 kHz for lower quality audio signals. The decomposition tree of FIG. 5 may be readily adapted for differing sampling rates both greater than or less than the 32 kHz sampling rate shown in FIG. 5.

In the illustrative example depicted in FIG. 5, scaled input data frame 90 is presumed to have a number of data samples, representing a frequency range between about 0 Hz and about 16 kHz. Scaled input data frame 90 is provided to high pass/low pass filter decimation pair 198, which partitions scaled input data frame 90 into a low pass wavelet band and a high pass wavelet band. High pass/low pass filter decimation pair 198 may be implemented as shown in any stage of the general example of FIG. 4. Each high pass band and low pass band may be further subjected to additional high pass/low pass filter decimation pairs to create a desired number of coefficients for each wavelet band.

FIG. 5 illustrates a partitioning of wavelet bands that approximates the critical bands in a psychoacoustic model. Critical band coefficients 200–227 each comprise a representative frequency range corresponding to a critical band. In order to partition the coefficients proportionally, some paths in the wavelet transform decomposition tree structure undergo additional processing by successively cascaded high pass/low pass filter decimation pairs.

Figure 6:
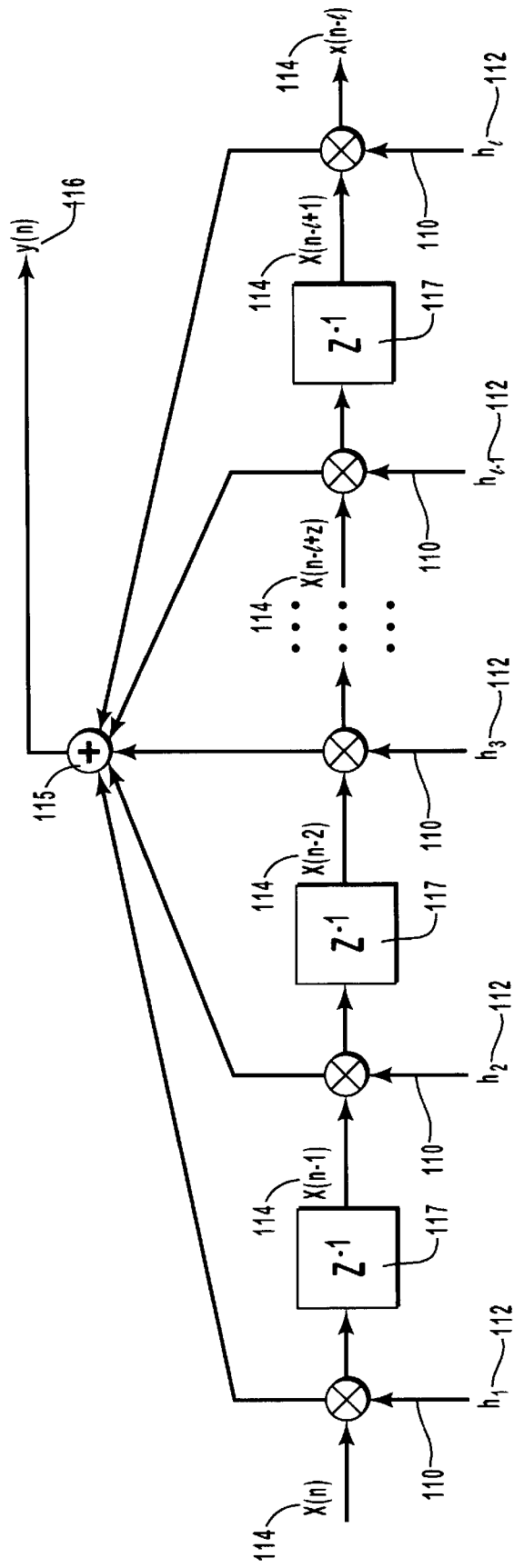
FIG. 6 is a general block diagram of a finite impulse response filter.

Although any wavelet filter can be utilized in this invention, in one preferred embodiment a Daubechies 12 wavelet filter is used. The Daubechies 12 wavelet filter can be accomplished using finite impulse response (FIR) digital filters. An FIR digital filter can be implemented as a weighted tapped delay line. Such an implementation is illustrated in FIG. 6. In FIG. 6, the filter has 1 stages or taps 110. Taps 110 have applied filter coefficients 112. Filter coefficients 112 multiply data samples 114. The product is then summed by summer 115 to yield final output 116. In FIG. 6, delay stages 117 are inserted between taps 110 to provide the necessary delay. Mathematically, output 116 can be written:

$$y(n)=x(n)h_1+x(n-1)h_2+x(n-2)h_3+\ldots+x(n-l+2)h_{l-1}+x(n-l+1)h_l$$

Where:

y(n) is the output of the filter for data sample n;

x(i) is the $i_{th}$ input data sample;

$h_i$ is the $i^{th}$ filter coefficient; and l is the number of taps in the filter.

This is usually written as:

$$y(n) = x(n) * h(n) = \sum_{k=-\infty}^{\infty} x(k)h(n-k)$$

Where:

y(n) is the output of the filter;

x(k) is the $k^{th}$ input data sample;

h(.) is the impulse response of the filter which corresponds to the filter coefficients; and

* is the convolution operator.

From the above description, it will be apparent to those of skill in the art that the FIR filters which comprise the wavelet transform can be implemented either using dedicated hardware or processing means such as a general purpose processor or special purpose digital signal processor. The coefficients for the Daubechies 12 wavelet filter are provided in Table 1 below.

TABLE 1

DAUBECHIES 12 FILTER COEFFICIENTS

| LOW PASS FILTER | HIGH PASS FILTER |
|---|---|
| 1.115407433500 E−01 | −1.077301085000 E−03 |
| 4.946238903980 E−01 | −4.777257511000 E−03 |
| 7.511339080210 E−01 | 5.538422010000 E−04 |
| 3.152503517090 E−01 | 3.158203931800 E−02 |
| −2.262646939650 E−01 | 2.752286553000 E−02 |
| −1.297668675670 E−01 | −9.750160558700 E−02 |
| 9.750160558700 E−02 | −1.297668675670 E−01 |
| 2.752286553000 E−02 | 2.262646939650 E−01 |
| −3.158203931800 E−02 | 3.152503517090 E−01 |
| 5.538422010000 E−04 | −7.511339080210 E−01 |
| 4.777257511000 E−03 | 4.946238903980 E−01 |
| −1.077301085000 E−03 | −1.115407433500 E−01 |

Returning now to FIG. 3, as previously described the output of the wavelet transform is a set of wavelet coefficients in several wavelet frequency bands. This is represented FIG. 3, by wavelet coefficient map 60. Although, wavelet coefficient map 60 is illustrated in FIG. 3 as a two-dimensional matrix, an apparatus comprising either discrete components or general purpose processing means or special purpose processing means may choose to store the wavelet coefficient map in a wide variety of forms including a single linear array. It is, however, important to be able to identify which wavelet coefficients are associated with which wavelet band. As discussed below, each wavelet band is processed independently. Furthermore, without this information, it is impossible to properly reconstruct the time domain signal from the wavelet coefficients.

One general characteristic of wavelet coefficients is that the relative importance of the coefficient is, at some level, correlated with its relative magnitude in the coefficient map. This means that relatively small wavelet coefficients can be eliminated without adversely affecting the quality of the reconstructed time domain signal. Magnitude, however, is not the only consideration that must be taken into account when determining whether a particular wavelet coefficient can be eliminated without adversely affecting the quality of the reconstructed audio signal. Other factors which are believed to play a role in quality of the reconstructed signal include the relative location in the wavelet coefficient map, the distribution of wavelet coefficients across the wavelet coefficient map and the type of audio signal being processed. Furthermore, our own research has shown that elimination of more than about 65% to about 75% of the wavelet coefficients can, depending on the type of audio signal being processed, result in significantly degraded quality in the reconstructed audio signal. Thus, this invention realizes that many different factors can influence the perceived quality of the reconstructed audio signal.

Since one of the primary goals of this invention is to reduce the number of bits required to store or transmit a digital audio signal without significantly degrading the perceived quality of the reconstructed digital audio signal, care is taken to eliminate coefficients in such a way as to minimize the impact on perceived quality of the reconstructed digital audio signal. Thus, the next step in FIG. 3 is to eliminate less important wavelet coefficients. This is illustrated in FIG. 3 by wavelet band elimination block 66. In wavelet band elimination block 66, wavelet bands are eliminated according to a designated criteria. In FIG. 3, the shaded wavelet bands in wavelet map 68 represent bands that have been eliminated by band elimination block 66. As previously described, it is possible to eliminate coefficients in some wavelet bands and still have acceptable performance. Depending on the desired bit rate, it may be necessary to eliminate one or more wavelet bands.

Any method which eliminates wavelet bands without introducing unacceptable noise or distortion into the data may be used. For example, it may be desirable to eliminate wavelet bands with small coefficients. As another example, it may be desirable to eliminate coefficients in low or high wavelet bands. In addition, embodiments may calculate certain parameters that help determine how many bands must be eliminated to obtain a desired bit rate. As explained in greater detail below, bit rate may be reduced by eliminating wavelet bands or by quantizing coefficients with fewer bits, or by a combination of both. In one embodiment, bit rate is controlled by a combination of eliminating wavelet bands and adjusting the quantization level.

Although any designated criteria may be used to eliminate wavelet bands, one embodiment uses a parameter F, which is related to the fraction of wavelet coefficients eliminated, to eliminate wavelet bands. The calculation of F is explained below in connection with the details of bit rate control block 70. A wavelet band is eliminated if the total number of bands times F raised to the one fourth power is less than the wavelet band index value. Mathematically:

if $BF^{1/4} \leq B_j$ then eliminate wavelet band $B_j$

Where:
 B is the total number of wavelet bands;
 F is a parameter between 0 and 1 calculated by bit rate control block 70; and
 $B_j$ is the wavelet band index with higher frequency wavelet bands having a lower index number.

It is apparent from the equation above that high frequency wavelet bands are eliminated first, as F increases toward 1. This may be somewhat counterintuitive, but research has shown that eliminating higher frequency bands first seems to provide better performance. Unless the filters used to perform the wavelet transform have sharp cutoff and low sidelobes, there will be some aliasing between wavelet bands. It is suspected that this aliasing makes it better to eliminate higher frequency bands. In embodiments where little aliasing occurs between bands, it may be useful to eliminate lower frequency bands. Other methods may also be used.

An important feature of the present invention is the ability to adjust or adapt the average bit rate of the data compressor in order to meet a required average bit rate. As used within the scope of this invention, bit rate refers to the number of bits output from the data compressor in a given period of time. This terminology is derived from the fact that one contemplated use of the inventive data compressor is to reduce the number of bits required to represent a digital audio data stream so that the digital audio data stream can be transmitted over a bandwidth limited communication channel. Bandwidth limited communication channels currently exist in many applications. For example, it may desired to transmit high-quality audio information over a standard 14.4 kbps modem or 28.8 kbps modem such as when audio information is transferred over telephone lines from the Internet to a user's computer.

This instant invention is not so limited, however. The present invention is also useful in reducing the number of bits used to represent a digital audio signal which needs to be stored for later retrieval. Such an application may be encountered where multi-media audio clips are stored on computer readable media for later retrieval and playing. In such an application, there will be an inherent tradeoff between the compressed size of the audio data and the quality of the reconstructed audio data. However, in order to squeeze the maximum amount of information on a single copy of computer readable media, it may be desirable to allocate an amount of storage to each portion of information. Although the term bit rate is used throughout this application, such a term should not be construed to limit the scope of this invention to applications where data is transmitted over a bandwidth limited communication channel. The term should be read to encompass a general measure of the number of bits used to represent the compressed audio signal.

In order to achieve the objective of matching the bit rate out of the compressor to the capacity of a bandwidth limited channel, the invention comprises means to adaptively control the bit rate. In FIG. 3, such means to adaptively control the bit rate is illustrated by bit rate control block 70. The bit rate control block plays a central role in determining how many wavelet bands are eliminated by wavelet band elimination block 66, and in determining an appropriate number of bits to represent the wavelet coefficients in each band. Elimination of wavelet bands and reduction in the number of bits used to represent wavelet coefficients translates into a reduced number of bits needed to represent the audio data.

Adaptively varying the data rate coming out of the data compressor is achieved primarily by a feedback control loop illustrated by bit rate control block 70 in FIG. 3. The operation of the bit rate control block 70 allows the data or bit rate to be varied as often as data frame to data frame in order to achieve a desired average bit rate. On the other hand, bit rate control block 70 can be set to vary the data rate less often if desired.

A wide variety of technologies can be utilized to implement bit rate control 70. By way of example, and not limitation, these technologies comprise various filtering and estimation loops such as alpha filters, alpha-beta filters, alpha-beta-gamma filters, Kalman filters, or any other optimal or sub-optimal filtering technologies. Additionally, technologies used to implement bit rate control block 70 may also comprise various neural network implementations.

Depending on the particular implementation selected, the output bit rate will have various characteristics. Such characteristics will include the ability of bit rate control block 70 to adapt to various external factors. For example, one application envisioned for this invention involves the simultaneous transmission of voice and data. Assuming that the data is provided by a separate device, the instant invention could be used to compress the voice to transmit it with the data. Assuming that the voice and data information are to be transmitted over a bandwidth limited communication channel, and depending on the amount of data being generated, a situation can arise where the amount of data being transmitted can fluctuate over time. This will create excess channel capacity which allows voice data to be transmitted on an interleaved basis with the data. In such a situation, the voice data would be presented with a communication channel which has a time varying bandwidth capacity. In such an environment, in one instant of time a large communication channel capacity may be available while at a second instant of time only a minimal or marginal communication channel capacity would be available. A compressor such as the one illustrated in FIG. 3 could adaptively vary the number of bits output from the compressor to match available communication channel capacity or allowable data bit rate. The type of technology selected for bit rate control block 70 will influence the ability of a compressor such as one illustrated in FIG. 3 to adapt to varying channel bandwidth capabilities or allowable data bit rate.

In order to illustrate some of the embodiments available for bit rate control block 70, the following embodiments are given by way of example and not limitation. In one embodiment, bit rate control block 70 will calculate a fractional percentage control parameter which roughly correlates to the percentage of coefficients which should be eliminated in the data frame either through a reduction of the number of quantization levels used to represent the wavelet coefficients or through elimination of wavelet bands, or a combination of both. Thus, bit rate control block 70 represents one example of a means for calculating a fractional percentage of wavelet coefficients that should be eliminated to achieve the desired bit rate. Places where the fractional percentage control parameter, F, are used may be examples of means for eliminating wavelet coefficients. The fractional percentage control parameter, F, may be calculated based on a comparison between a desired average bit rate and the number of data bits transmitted last frame. Such an embodiment can be mathematically implemented by first calculating an error measurement between the number of bits transmitted last frame and a desired number of bits to be transmitted. The calculated fraction of coefficients to be eliminated is then calculated as a filtered estimate using this error. Mathematically, first calculate the error as:

$$\epsilon = \frac{B_t - B_s}{B_s}$$

Where:

$\epsilon$ is the normalized error;

$B_t$ is the number of bits transmitted or stored last data frame; and $B_s$ is the desired number of bits per data frame (the setpoint).

The fractional percentage control parameter, F, is then given as:

$$F_n = F_{n-1} + \alpha_f \epsilon$$

Where:

$F_n$ is the current fractional percentage control parameter;

$F_{n-1}$ is the last fractional percentage control parameter;

$\alpha_f$ is a smoothing coefficient; and $\epsilon$ is the normalized error calculated above.

The current value of F is used in various locations, such as wavelet band elimination block 66 discussed above and band parameter calculation block 64 discussed below.

Those skilled in the art will recognize that the above equation is an alpha smoothing filter. As previously discussed, $\alpha_f$ is a smoothing coefficient which is generally less than 1. Furthermore, the smaller that $\alpha_f$ becomes the more heavily smoothed the fraction $F_n$ will be. Such an alpha filter works reasonably well when the communication channel bandwidth varies in a smooth or slowly varying way. Although a larger value of $\alpha_f$ will cause F to converge in fewer iterations, some oscillation may result. Thus, in some embodiments a smaller value for $\alpha_f$ may be desired. In one embodiment an $\alpha_f$ value of 0.5 has been found to perform favorably for many audio applications. Those skilled in the art will recognize that the particular $\alpha_f$ value which works the best will depend solely on how the channel bandwidth fluctuates.

If the communication channel capacity fluctuates in a step-wise manner, for instance oscillating between a relatively large value and a relatively small value, it may be desirable to have $\alpha_f$ be a time-varying quantity. In other words, it may be desirable to keep $\alpha_f$ at a relatively small value when the channel capacity is constant, or nearly so, and when the channel capacity changes by a large amount, set $\alpha_f$ to a relatively large value in order to allow the data compressor to match the number of bits being sent to the channel capacity in a relatively short period of time. After the compressor has matched the number of bits being transmitted to the channel capacity, $\alpha_f$ can then be set to a small value again.

If the channel capacity fluctuates in an unpredictable manner remaining at a specified value for only a very short period of time, it may be desirable to replace the alpha filter described above with a more sophisticated filtering system. Those skilled in the art will recognize that the field of filtering and estimation is vast with many types of filters including alpha-beta filters, alpha-beta-gamma filters, Kalman filters, and the like. Each of these filters trades off computing time for a more sophisticated model which can account for various types of fluctuations. Typically, these filters involve not only estimation of the parameter or parameters desired, but a limited prediction ability which attempts to predict what the future value of a particular parameter might be.

In addition to conventional filtering technology, many advanced technologies may also be used in bit rate control block 70. One potential technology which may hold promise for communication channels which have fluctuating band widths, is neural network technology. Neural network technology devises structures which attempt or mimic various aspects of the human neural system. Such technologies have shown promise in estimating or predicting various quantities. Neural network technology can therefore be applied to bit rate control block 70.

Returning now to FIG. 3, after the required number of wavelet bands have been eliminated by wavelet band elimination block 66, which wavelet band is processed independently to normalize, quantize, and entropy encode the wavelet coefficients in each band. In FIG. 3, the processing of each wavelet band is illustrated by the plurality of processing channels for band normalization block 74, band quantization block 78, and band entropy encoding block 82.

Band normalization block 74 and band quantization block 78 require various parameters calculated from the coefficients in each wavelet band. For example, as described below, normalization block 74 requires a gain parameter and band quantization block 78 requires the number of quantization bits to be used. The parameters are calculated for each wavelet band in band parameter calculation block 64.

Figure 7:
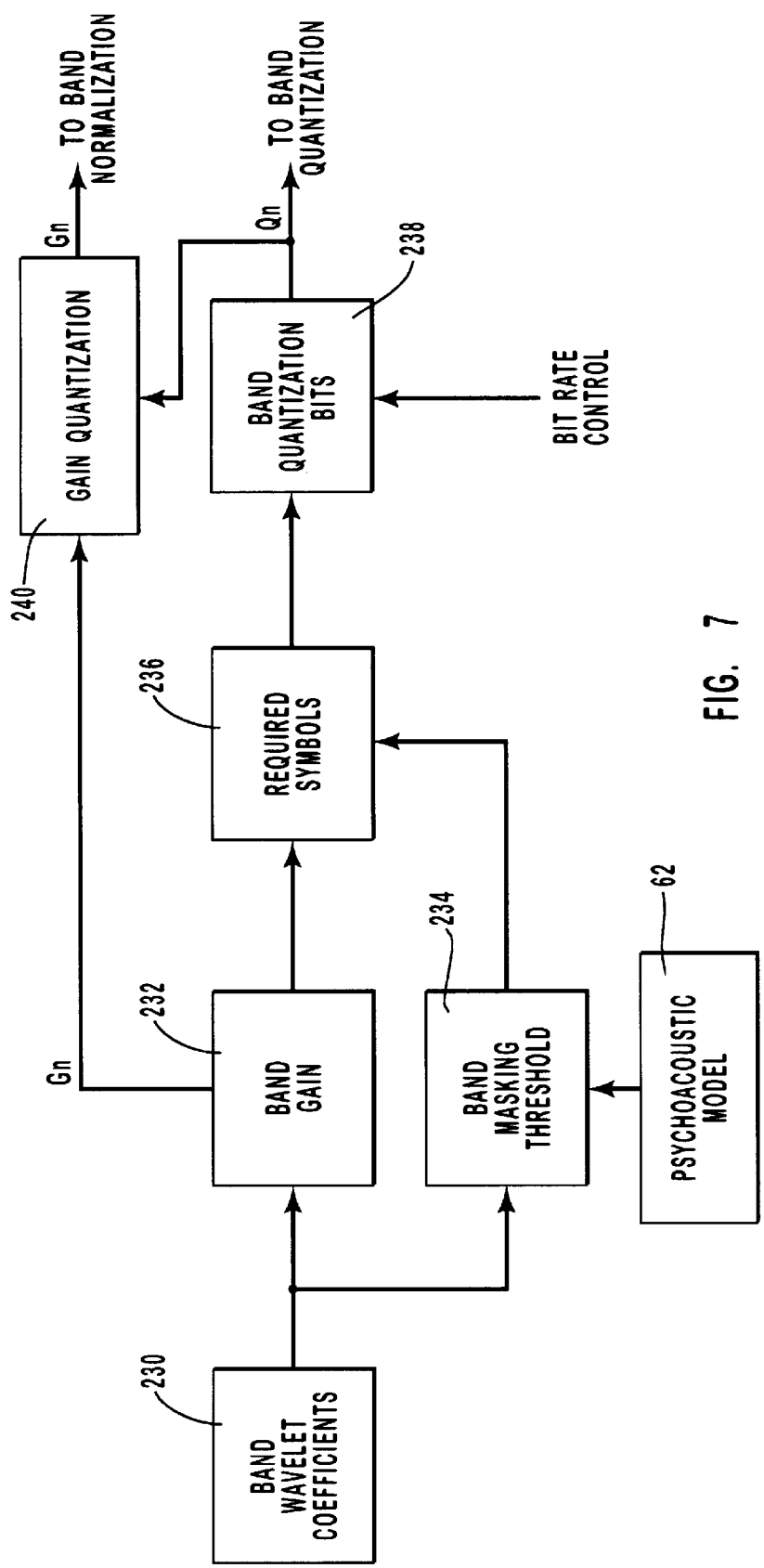
FIG. 7 is an example implementation of band parameter calculation block 64 of FIG. 3.

Referring now to FIG. 7, the details of band parameter calculation block 64 are presented. FIG. 7 shows the parameter calculation for a particular wavelet band. As illustrated in FIG. 7, the wavelet coefficients for the wavelet band 230 are first used to calculate the band gain, as illustrated by band gain calculation block 232. The gain for a particular wavelet band is the magnitude of largest wavelet coefficient in the band. Mathematically:

$$G_n = max_j\{|C_{nj}|\}$$

Where:

$G_n$ is the gain for the nth wavelet band; and $C_{nj}$ is the jth wavelet coefficient in the nth wavelet band.

As illustrated in FIG. 7, after the gain has been quantized by gain quantization block 240, the band gain, $G_n$, is sent to band normalization block 74, discussed below.

Band masking threshold block 234 calculates the masking threshold for the wavelet band. As previously described, a strong signal in one band may mask a weaker signal in another band. This masking can be derived experimentally for a human ear. Thus, in FIG. 7 psychoacoustic model 62 is used to provide information used to calculate a masking threshold for the wavelet band. The masking threshold for the nth wavelet band, $M_n$, may be calculated using:

$$M_n = \sqrt{RMT_n \sum_{j=1}^{\infty} \left[ P_{n-j} \left( \frac{freq_{n-j}}{freq_n} \right)^{28} + P_{n-j} \left( \frac{freq_{n-j}}{freq_n} \right)^{-10} \right]}$$

Where:

$RMT_i$ is the relative masking threshold of the ith wavelet band (from psychoacoustic model);

$P_i$ is the power in the ith wavelet band; and $freq_i$ is the center frequency of the ith wavelet band.

Figure 13:
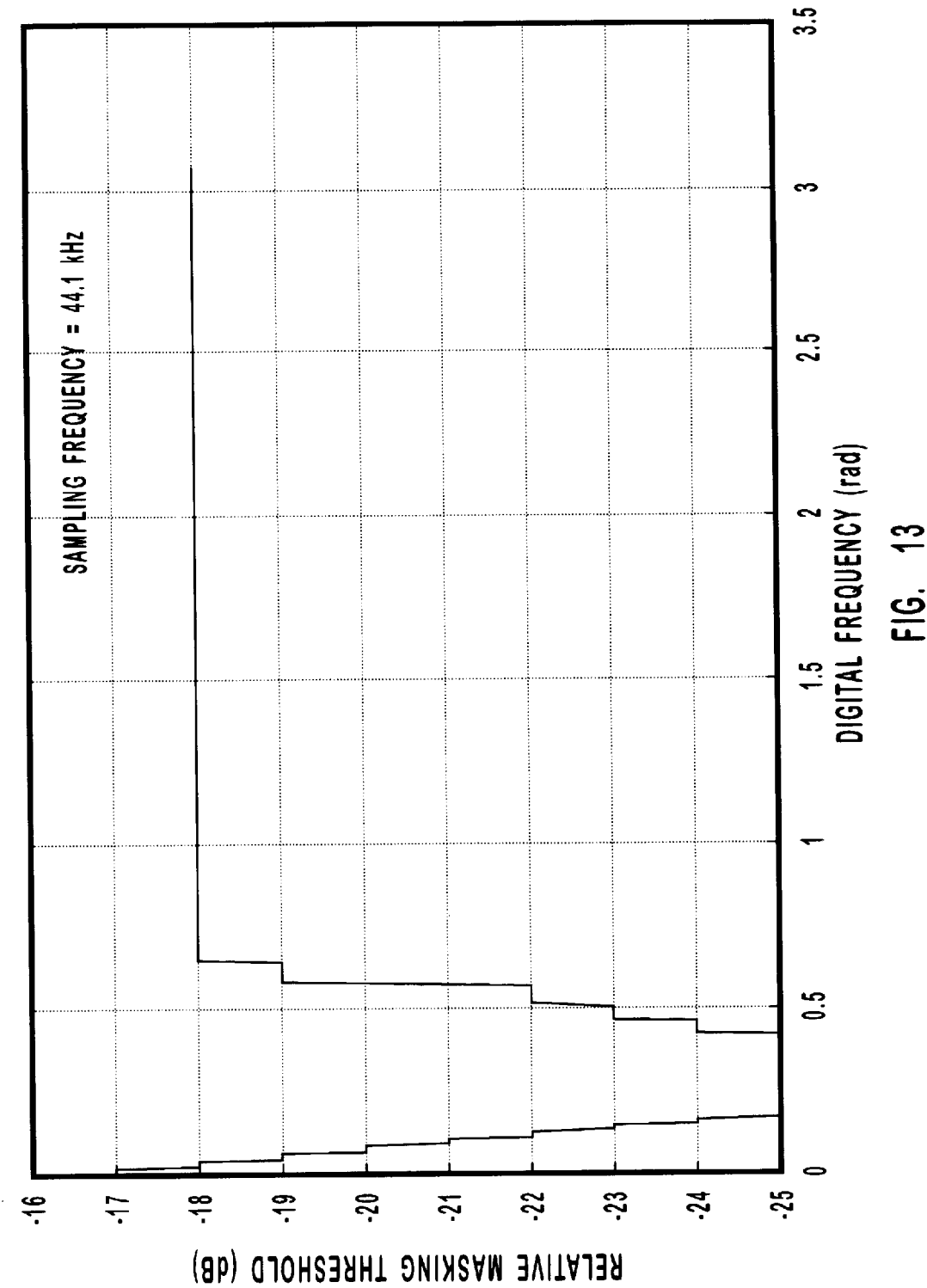
FIG. 13 is a graph giving RMT values for one embodiment.

The relative masking threshold for the nth wavelet band, $RMT_n$, can come from any suitable psychoacoustic model. A suitable model is disclosed in FIG. 4 of *Low Bit Rate Transparent Audio Compression Using Adapted Wavelets*, by Deepen Sinha and Ahmed H. Tewfik published in *IEEE Transactions on Signal Processing*, Vol. 41, No. 12, Dec. 1993. This figure is reproduced in FIG. 13 for convenience.

The above equation contains an infinite sum. However, because there are only a finite number of wavelet bands, the infinite sum reduces to a finite sum since the power of any band falling outside the range $0 \leq i \leq N-1$ will be zero, assuming N wavelet bands. If desired, even fewer terms may be used, although this will result in some inaccuracies in the calculation. In one embodiment, the above equation is only evaluated for j=1 and j=2 (two terms in the summation), for computational efficiency.

The power in a wavelet band, $P_n$, can be calculated by summing the square of all wavelet coefficients in the band. Mathematically:

$$P_n = \sum_j C_{nj}^2$$

Where:

$C_{nj}$ is the jth wavelet coefficient in the nth wavelet band.

The gain of the wavelet band, $G_n$, and the masking threshold for a particular wavelet band, $M_n$, are used by required symbols block 236 to calculate the minimum number of symbols needed to represent the wavelet coefficients of the band in order to mask quantization noise in the reconstructed signal. The minimum number of symbols, $S_n$, may be calculated by:

$$S_n = \left\lceil \frac{G_n}{M_n} \right\rceil$$

Where:

$G_n$ is the gain of the wavelet band calculated above;

$M_n$ is the masking threshold of the wavelet band calculated above; and $\lceil \bullet \rceil$ returns the smallest integer greater than or equal to the operand.

Once the number of symbols have been calculated, band quantization bits block 238 calculates the actual number of quantization bits that will be used to represent the coefficients in the wavelet band according to the equation:

$$Q_n = \lceil \log_2(FS_n + U(FS_n - 1)) \rceil$$

Where:

F is the control parameter calculated by bit rate control block 70 as previously described;

$S_n$ is the number of symbols calculated as shown above;

$U(\bullet)$ is the unit step function; and $\lceil \bullet \rceil$ returns the smallest integer greater than or equal to the operand.

Note that in the above equation one extra bit is used when $FS_n$ is greater than one. This aids in entropy encoding as explained below. Furthermore, if F=1, then the quantization will be perceptually lossless while if $F \leq 1$, the quantization noise will increase.

To further control the bit rate, it may be desirable to place a maximum value on the instantaneous bit rate coming out of the compressor. When this maximum has been reached, bit rate control block 70 of FIG. 3 can send a signal to band parameter calculation block 66 to set $Q_n$ to zero. In some applications, however, this may cause unacceptable distortion and other methods may need to be used to control the instantaneous bit rate.

For bands which have been eliminated by wavelet band elimination block 66, $Q_n=0$. As illustrated below, when $Q_n=0$ there is no need to send other information regarding the wavelet band.

When $Q_n>0$, the gain is then clipped so that it will not fall below a specified minimum nor rise above a specified maximum. This is important because as described hereafter, the gain value will be quantized by gain quantization block 240 of FIG. 7. If the gain value falls below the lowest quantization level, the gain will be quantized to zero and during reconstruction of wavelet map 68, all wavelet coefficients for that particular wavelet band will be eliminated by multiplying them by a zero gain value. On the other hand, if the gain is allowed to rise above the maximum quantization level, distortion will be introduced in the reconstructed output signal due to the limiting effect the gain quantization will have.

Returning for a moment to FIG. 7, the gain quantization process of gain quantization block 240 is explained. The gain for a particular wavelet band calculated as described above, $G_n$, is first adjusted to an acceptable table value. Each band may have an individual table because the maximum value in each band may be different. The gain value is then quantized at a selected quantization level. In some embodiments, the quantization level will be fixed throughout the compression process. In other embodiments the quantization level will vary. In either case, it is important to select a quantization level having a sufficient number of bits so that distortion due to quantization noise is held within the desired perception levels.

Returning now to FIG. 3, after the gain has been calculated and quantized as described above, the value is fed down into band normalization block 74 which normalizes the wavelet coefficients of the wavelet band by dividing each wavelet coefficient by the gain to produce normalized wavelet band 76.

After normalized wavelet band 76 has been generated, normalized wavelet band 76 is then quantized. This is illustrated in FIG. 3 by band quantization block 78. Band quantization block 78 is an example of means for quantizing wavelet coefficients. The basic purpose of band quantization block 78 is to represent each of the normalized wavelet coefficients in normalized wavelet band 76 by a specified number of bits.

Figure 8:
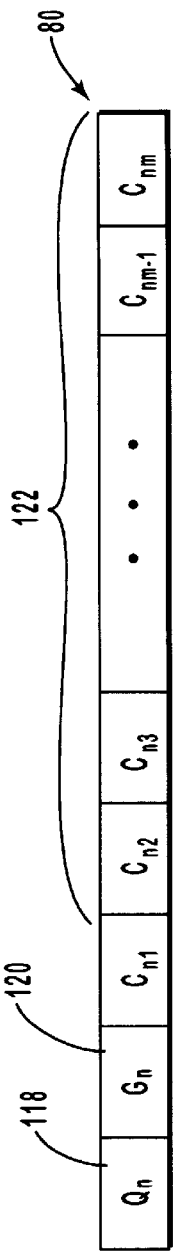
FIG. 8 is the output data frame for a single wavelet band of one preferred embodiment.

The final purpose of band quantization block 78 is to begin assembling the information that will be included in the output data frame for each individual wavelet band. This is represented in FIG. 3 by output wavelet band 80. Output wavelet band 80 is more clearly illustrated in FIG. 8. As depicted in FIG. 8, the first piece of information included in output wavelet band 80 is the number of quantization bits for that band, $Q_n$. This is illustrated in FIG. 8 as 118. The calculation of $Q_n$ has been explained previously. As an alternative to including $Q_n$, the number of symbols, $S_n$, or some other measure of the number of quantization bits may also be used. Note that if $Q_n=0$, this is the only piece of information included for that wavelet band. Thus, wavelet bands eliminated by wavelet band elimination block 66 or other wavelet bands that have $Q_n=0$ will be represented by a single piece of information.

Following the number of quantization bits, $Q_n$, comes the gain for the wavelet band, $G_n$, illustrated in FIG. 8 as 120. Gain 120 is followed by the quantized wavelet coefficients of the wavelet band. As illustrated in FIG. 8, all m coefficients of the wavelet band are included in output wavelet band 80. This includes the coefficients which have been eliminated by setting their value to zero due to quantization. It is important to be able to place the coefficients in their proper location within the wavelet coefficient map. Therefore, when a data decompressor eventually reconstructs a wavelet coefficient map from output wavelet band 80, the compressor must be able to ascertain all coefficient locations. While it would be possible to eliminated the zero coefficients and transmit only coefficients having a non-zero value, this would necessitate transmitting a coordinate location within the wavelet coefficient map so that the coefficient could be placed in the proper location. Although such embodiments are contemplated within the scope of this invention, currently it is preferred to keep the eliminated coefficients as place holders in order to allow rapid reconstruction of wavelet coefficient map. Such an approach incurs no penalty and, in fact, is believed to be the best general way of preserving wavelet coefficient location information within output wavelet band 80. The reason no performance penalty is incurred is because of an efficient entropy encoding method used within the data compressor.

Rather than quantize the individual wavelet coefficient as described above, other embodiments may use vector quantization. In its simplest form, vector quantization quantizes groups or vectors of coefficients such that some specified error criteria is minimized. In an embodiment using vector quantization, band quantization block 78 would first separate the normalized wavelet coefficients into groups of coefficients called vectors according to some predetermined criteria. In one embodiment, such criteria may be to divide normalized wavelet coefficients into a predetermined number of vectors each having an equal number of coefficients. In another embodiment, such criteria may be to use an entire normalized wavelet band or groups of wavelet bands as a vector. In this embodiment each vector may have a different number of coefficients.

After the normalized wavelet coefficients have been divided into vectors, each vector is replaced by a quantized vector from a quantized vector codebook. The vector selected from quantized vector codebook is chosen so as to minimize the error between the selected quantized vector and the original unquantized vector. Many different error measures can be used, but most error measures are some variant at an RMS error measure.

In embodiments which use vector quantization, it may be desirable to modify other portions of the data compressor. In such an implementation it may be desirable to dynamically trade off various parameters of the coefficient elimination criteria and the vector quantization implementation. For example, it may be desirable to eliminate coefficients and divide the normalized wavelet bands in such a way as to maximize the number of vectors containing all zero coefficients.

In still other embodiments, different methods of selecting quantized vector codebooks may be used. For example, in one embodiment a single quantized vector codebook may be used for all vectors. In other embodiments a plurality of quantized vector codebooks may be used. In such embodiments various criteria can be used to select the appropriate quantized vector codebook. For example, the quantized vector codebook may be chosen based on the wavelet frequency band.

After output wavelet band 80 has been assembled, it will be apparent from the previous discussion that each output wavelet band contains a large amount of redundant information. This redundant information can be eliminated effectively with entropy encoding methods. In FIG. 3, these entropy encoding methods are illustrated by entropy encoding block 82, which represents an example of means for entropy encoding. As illustrated in FIG. 3, each wavelet band may be separately encoded. In the alternative, one entropy encoder may be used for all wavelet bands. Although any conventional entropy encoding method will remove some of the redundancy in output wavelet band 80, significant effort has been expended in determining the types of redundancy in output wavelet band 80 and developing specific entropy encoding methods to remove that redundancy.

Entropy encoding methods can be broken down into two broad categories, those using fixed codebooks and those using adaptive codebooks. In selecting an entropy encoding method, several factors should be considered. The first consideration in selecting an entropy encoding method should be the environment in which the data compressor is operating. For example, if the data compressor is operating in an environment where all data receivers are guaranteed to receive the beginning of each audio data stream and all data compressed with the data compressor, then perhaps entropy encoding methods utilizing adaptive codebooks may be a viable alternative. One general problem which exists when adaptive codebooks are used is synchronization of the codebooks between the data compressor, which is usually associated with a data transmitter, and a data decompressor, which is usually associated with the data receiver. Because codebooks in adaptive entropy encoding methods evolve over time and the current state of the codebook is dependent on all previous data which has been compressed, in order to decompress the data, the data compressor must begin at the same place the data compressor began and receive all data which has been compressed by the compressor so that the codebook in the data decompressor evolves in the same manner as the codebook in the data compressor.

There are other ways to synchronize codebooks between a data compressor and a data decompressor, but these methods are generally limited to a specific type of environment or communication protocol. For example, if a data receiver is going to start receiving data from a data compressor, the data compressor could first transmit the present state of the codebook followed by compressed data. Unfortunately, this necessitates transmitting a potentially large codebook. If the communication channel is bandwidth limited, this may not be a viable alternative. Although the preceding discussion has taken place in the context of data transmitted between a data transmitter and a data receiver, the same considerations apply between data which has been compressed and stored for later retrieval by a data decompressor.

In selecting an entropy encoding method for use with the data compressor, other considerations include the length of the data stream to be compressed, the type of data to be compressed, and the local and global statistics of the data to be compressed. If the data streams which are to be compressed are relatively short, adaptive codebook entropy encoding methods are generally less efficient. This is because in an adaptive codebook method, the codebook must be trained and adapted to the statistics of the data being compressed. In the initial stages of compression, the codebooks tend to be very inefficient. In order to effectively utilize adaptive codebook methods, the data stream must be long enough to allow the codebook to evolve to an efficient state. The type of data being compressed as well as the local and global statistics of such data are important because this will indicate how efficient various types of entropy encoding methods are.

In one embodiment a entropy encoding method has been developed which takes advantage of the statistics of a single data frame, as well as the statistics of many successive data frames. The coding method which is preferred in one embodiment is a coding method based on a combination of multiple Huffman encoders and a run length encoder. In one embodiment adaptive codebooks are used. In another embodiment, fixed codebooks are used. These individual methods are known to those of skill in the art. The discussion which follows will therefore focus on the unique combination of these methods developed for use with the present invention.

Figure 9:
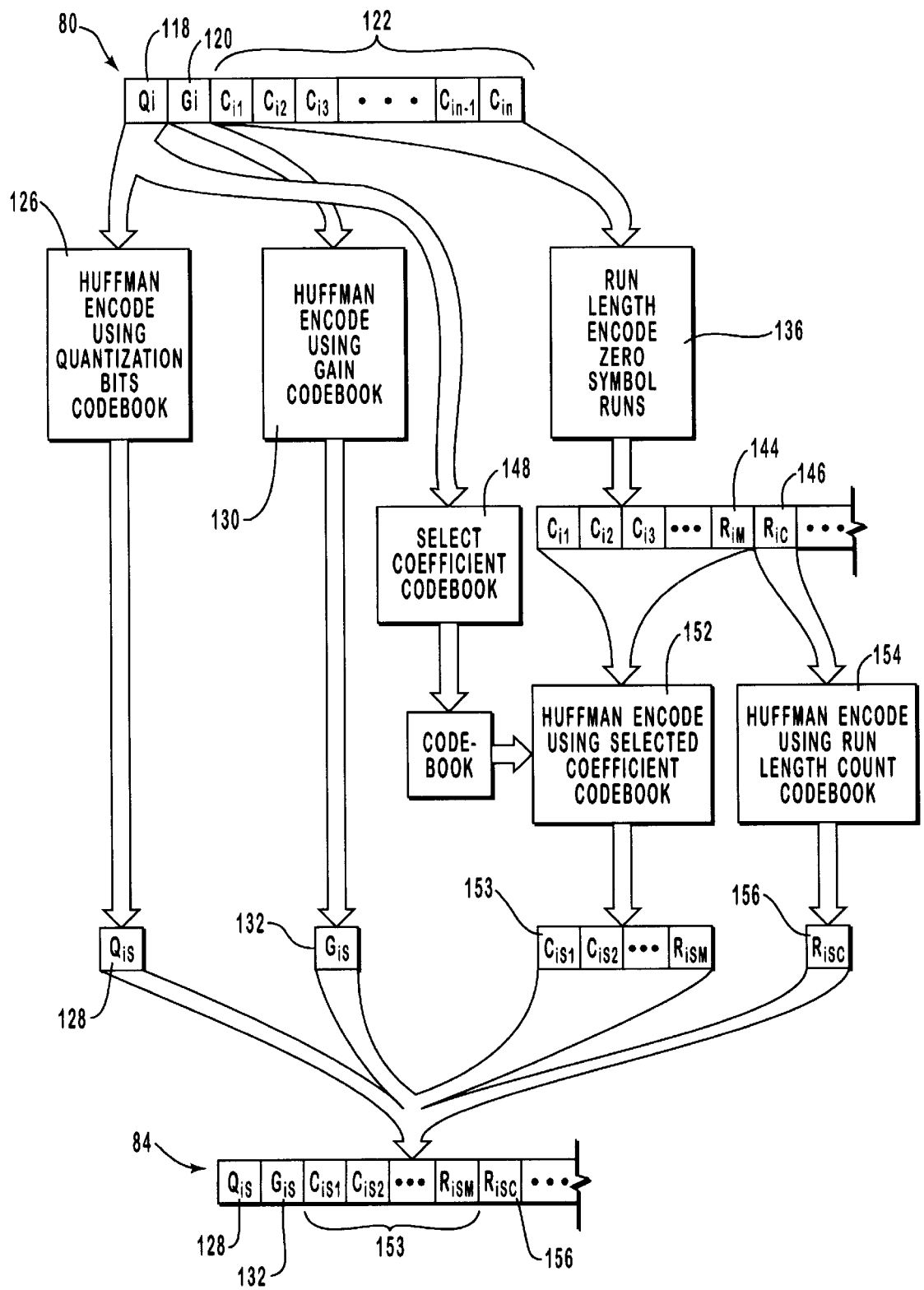
FIG. 9 is a diagram illustrating entropy encoding of one preferred embodiment.

The inventive encoder is illustrated in FIG. 9 which presents how a single wavelet band (the ith wavelet band) is encoded. An examination of output wavelet band 80 in FIG. 8 will show that an output data frame comprises a quantization bits value, a gain value, and a plurality of wavelet coefficients. Many of the wavelet coefficients may have been eliminated and set to a zero value. Referring now to FIG. 9, the basic structure of the entropy encoder is presented. As illustrated therein, a plurality of codebooks are used. In FIG. 9, the quantization level is first compressed by Huffman encoding the number of quantization bits using a quantization bits codebook. This is illustrated in FIG. 9 by Huffman encoding block 126. As illustrated in FIG. 9, the number of quantization bits 118 is encoded by replacing quantization bits 118 with the corresponding symbol found in the quantization bits codebook. The encoded quantization bits symbol is illustrated in FIG. 9 by quantization bits symbol 128.

Similar to the process of encoding the quantization bits, gain level 120 is Huffman encoded using a gain codebook. This is illustrated in FIG. 9 by Huffman encoding block 130. As illustrated in FIG. 9, gain 120 is replaced by gain symbol 132.

Finally, the quantized wavelet coefficients found in output wavelet band 80 are encoded using a combination of run length encoding and Huffman encoding. This process is generally illustrated in FIG. 10.

Figure 10:
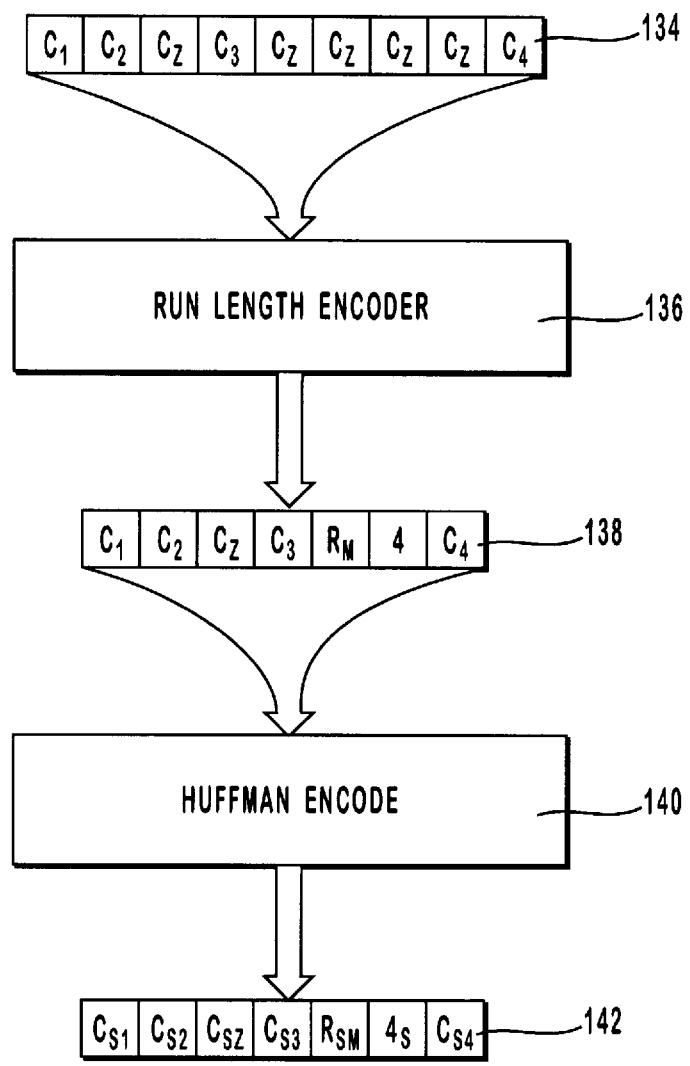
FIG. 10 is a diagram illustrating entropy encoding wavelet coefficients of one wavelet band of one preferred embodiment.

In FIG. 10, quantized coefficients 134 are first encoded by run length encoder 136. Run length encoder 136 is slightly different from a standard run length encoder. Run length encoder 136 only run lengths encodes coefficients which have been eliminated. In other words, run length encoder 136 encodes coefficients which have a zero value. Referring to FIG. 10, an example sequence of coefficients is $C_1$ $C_2$ $C_z$ $C_3$ $C_z$ $C_z$ $C_z$ $C_z$ $C_4$. In this sequence $C_j$ represents a coefficient having a non zero value and $C_z$ represents a coefficient having a zero value. As illustrated in FIG. 10, run length encoder 136 will encode the run of four consecutive zero coefficients to yield the sequence $C_1$ $C_2$ $C_z$ $C_3$ $R_m$ 4 $C_4$. This is run length encoded sequence 138 in FIG. 10. In this sequence, the run of four zero symbols, $C_z$, have been replaced by $R_m$ which represents a run length marker and the number 4 which indicates the length of the run of zero symbols. As previously mentioned, run length encoder 136 will only encode runs of zero coefficients. If runs of other coefficients appear, run length encoder 136 will pass the coefficients unencoded.

After quantized coefficients 134 have been encoded by run length encoder 136 to yield run length encoded sequence 138, run length sequence 138 is next encoded by Huffman encoding. This is illustrated in FIG. 10 by Huffman encoder block 140. Although Huffman encoding block 140 utilizes a plurality of codebooks to encode run length encoded sequence 138, conceptually, each coefficient in run length encoded sequence 138, including any run length markers, $R_m$, and run length counts which follow the run length markers, are encoded by replacing them with the appropriate symbol from the appropriate codebook. In FIG. 10, the output of Huffman encoding block 140 is represented by Huffman encoded sequence 142. As illustrated in FIG. 10, coefficient $C_1$ has been replaced by coefficient symbol $C_{s1}$, coefficient $C_2$ is replaced by coefficient symbol $C_{s2}$, and so forth.

Returning now to FIG. 9, a more detailed illustration of how coefficient sequence 122 is encoded is illustrated. As illustrated in FIG. 9, coefficient sequence 122 is first encoded using run length encoder 136 as previously described. As previously described, run length encoder 136 will replace a run of zero coefficients with run length marker 144 and run length count 146. As those skilled in the art will recognize, run length marker is a special symbol designed to alert the entropy decoder to insert a run of zero symbols. Run length count 146 then informs the run length decoder how many zero symbols should be inserted. From this description it becomes obvious that only runs of two or more symbols should be encoded in this method. Run length encoder 136 operates in this manner.

After coefficient sequence 122 has been run length encoded, the next step is to encode the remaining coefficients, including any run length markers and run length counts, using Huffman encoding. In one preferred embodiment, a single codebook can be used to encode all of these values. In another preferred embodiment, the coefficients and run length markers are encoded using one codebook and the run length counts are encoded using a separate codebook. In yet another embodiment, separate coefficient codebooks are kept for each different quantization level. This is the embodiment illustrated in FIG. 9.

If multiple codebooks are used to encode coefficients based on the number of quantization bits which are used to quantize the coefficients, means to select an appropriate codebook must be included. In FIG. 9, such means as illustrated by select coefficient codebook block 148. As illustrated in FIG. 9, select coefficient codebook block 148 receives quantization bits 118, selects an appropriate coefficient codebook 150, and passes the appropriate codebook to Huffman encoding block 152.

As further illustrated in FIG. 9, all coefficients are encoded using the selected coefficient codebook. This encoding includes any run length markers 144. In one preferred embodiment, however, the run length count associated with any run length marker is encoded using a separate run count codebook. This is illustrated in FIG. 9 where run length count 146 is encoded by Huffman encoding block 154 to produce run count symbol 156.

Note that the above process occurs only for wavelet bands with a non-zero quantization bits value. As previously explained, if $Q_n$ is zero, then that is the only value that need be transmitted or stored for the particular output wavelet band. Thus, in such a situation output wavelet data frame 84 would contain only a single zero value.

After all data in an output wavelet band 80 has been encoded with the appropriate symbols, the data is assembled into encoded an output wavelet data frame 84. This encoded output wavelet data frame is combined with other output wavelet data frames from other wavelet bands into output data frame 86 of FIG. 3 and is then transmitted across the communication channel to the data receiver or is stored for later retrieval. In FIG. 3, this process is illustrated by compressed data stream 50. By running compressed data stream through an appropriate decompressor, a reconstructed version of input data stream 30 can be obtained. The process of decompression is discussed below.

Returning again to FIG. 3, bit rate control block 70 is shown to have input block 72. Input block 72 represents factors received from outside the data compressor which may influence how bit rate data control block 70 operates. One such factor which comes from outside the data compressor is the desired bit rate. Thus input block 72 can represent one example of means for determining a desired bit rate. Other external factors can also be taken into account by bit rate control block 70. One such factor may be the amount of data which has already been compressed but which has not yet been transmitted. In other words, as encoded output data frame 86 is output from the compressor, the compressor may want to monitor how many data frames have previously been output but are still waiting to be transmitted. This delay in transmission is generally referred to as data latency. As data latency increases, it may be desirable to reduce the number of bits being output by the data compressor in order to give the data which has been compressed an opportunity to be transmitted without a large data latency. It is conceivable that any factor which would indicate that it is desirable to transmit either a greater number of bits or a fewer number of bits can be utilized by bit rate control block 70 to help adjust and adapt the bit rate of the compressor.

Figure 11:
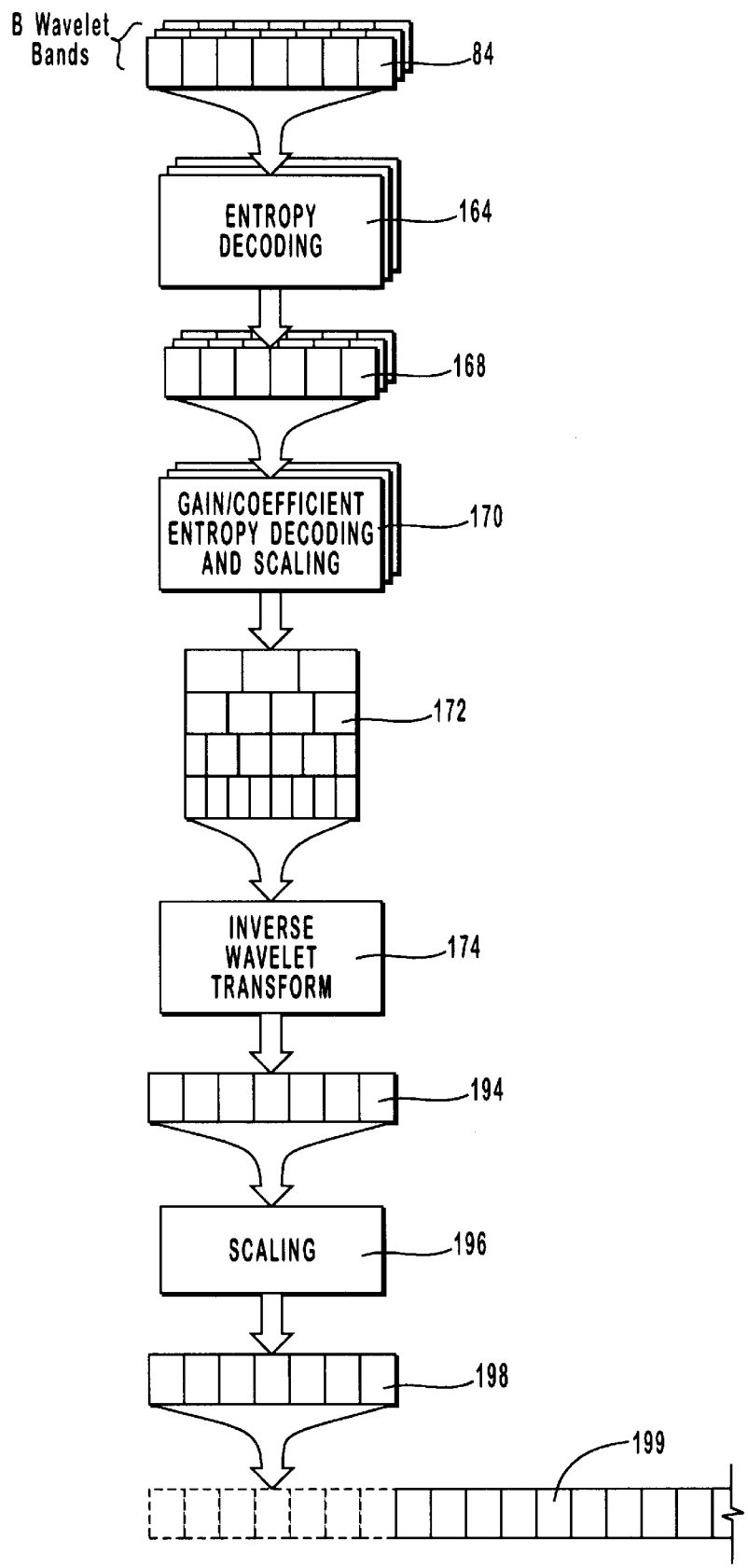
FIG. 11 represents the decompression process of one preferred embodiment of the present invention.

Turning now to FIG. 11, one embodiment of a decompressor designed to operate with the disclosed compressor is illustrated. As indicated in FIG. 11, the process of decompressing a previously compressed data stream is much simpler than the process of compressing a data stream. This feature is common to most compression/decompression schemes. It is, however, interesting that when the disclosed compressor and decompressor are implemented on general purpose computer hardware, such as an IBM type personal computer, the amount of computing time needed to compress an input data stream and decompress an input data stream is remarkably similar with compression only taking about 1%–5% more computing power to compress a data stream than to decompress a data stream. Furthermore, the compressor and decompressor can run in real time or near real time on a Pentium-75 class computer and use only between about 10% to about 60% of the total computing power.

As illustrated in FIG. 11, the decompressor first takes each encoded output wavelet data frame 84 and reverses the entropy encoding process. This is illustrated in FIG. 11 by entropy decoding block 164, which represents an example of means for entropy decoding. Frame 11 graphically represents a single frame of data having B wavelet bands for a given sampling rate. The value for B may be transmitted in the header information of data frame 86 of FIG. 3. The entropy decoding process simply reverses the Huffman encoding and run length encoding which has taken place for each band in the compressor. The number of quantization bits, $Q_i$, represents the number of bits used to quantize the coefficients in the ith critical band. $Q_i$ is entropy encoded in the preferred embodiment using Huffman entropy encoding as previously described. Each band may have a separate entropy encoder for the quantization bits. The encoded gain is decoded using Huffman decoding and the gain coefficient codebook. The encoded coefficients, and any encoded run length markers are Huffman decoded using the proper coefficient codebook. As previously described, if the coefficients and run length markers were encoded using a codebook selected based on the quantization level, the encoded coefficients and run length markers must be decoded using a codebook selected based on the quantization level. Any encoded run counts are Huffman decoded using the run count codebook. Finally, entropy decoding block 165 replaces run length markers and associated run length counts with the appropriate number of zero coefficients. If entropy encoders other than the illustrative example disclosed herein are used, an appropriate entropy decoder will also be used. If $Q_i=0$, then no more useful information exists in the ith critical band and therefore other quantities were not transmitted in that band. The coefficients of that band may then be set to zero with additional processing of that band being bypassed.

The entropy decoding process results in a decoded output data frame 168. Since the entropy encoding process and entropy decoding process is preferably lossless, each decoded output data frame 168 in FIG. 11 should be identical to the corresponding output data frame 84 in FIG. 3 except that once the data frame has been entropy decoded there is no need to retain the quantization level value. Therefore, the quantization level is removed from reconstructed output data frame.

Decoded data frame 168 is then scaled by the data frame gain value. This is illustrated in FIG. 11 by gain scaling block 170. In gain/coefficient entropy decoding and scaling block 170, the gain factor, $G_i$, is decoded for the ith band. Gain factor, $G_i$, as described above, was entropy encoded during the encoding process. Each wavelet band may have a separate entropy coder for the gain factor. Gain factor, $G_i$, represents an index into a table or codebook of possible gains for the ith band. After the gain is decoded, the coefficients in each wavelet band are rescaled by multiplying them by the gain for that band.

The rescaled wavelet coefficients are represented in FIG. 11 by scaled wavelet coefficient map 172. At this point, scaled wavelet coefficient map 172 is quite similar to wavelet coefficient map 68 in FIG. 3. However, due to the quantization of the gain value and wavelet coefficients, scaled wavelet coefficient map 172 contains quantization noise which is not found in wavelet coefficient map 68 in FIG. 3.

Figure 12:
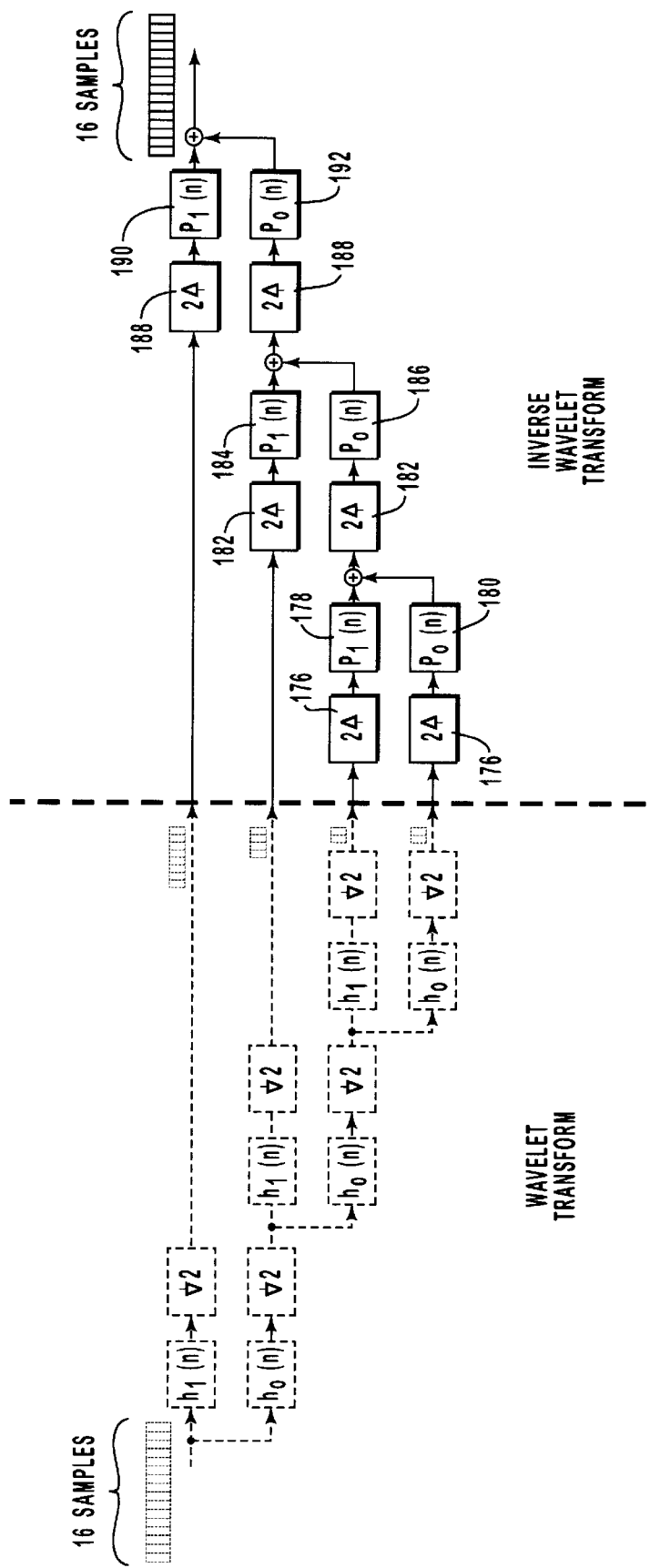
FIG. 12 is an illustrative example an inverse wavelet transform.

Returning to FIG. 11, scaled wavelet coefficient map 172 is then placed through an inverse wavelet transform illustrated in FIG. 11 by inverse wavelet transform block 174. Wavelet transform block 174 represents an example of means for performing an inverse wavelet transform. The inverse wavelet transform is performed in a similar manner to the wavelet transform previously described. The general process is illustrated in FIG. 12. In FIG. 12, the initial wavelet transform using a decomposition tree structure is shown in phantom lines. This initial transform is presented by way of example and is the wavelet transform illustrated in FIGS. 4–6. As indicated in FIG. 12, the process of the inverse wavelet transform can be implemented by reversing the decimation which occurred during the transform, filtering, and summing the outputs of the filters.

In order to explain the process more fully, the process begins with interpolation blocks 176. Interpolation blocks 176 are designed to reverse the effects of decimation blocks 96 in FIG. 4. The interpolation process is accomplished by inserting a zero value between the wavelet coefficients for these filter bands. The zero value replaces the value of the coefficient which was thrown away during the decimation process. After interpolation blocks 176, the coefficients are passed through high pass filter 178 and low pass filter 180. High pass filter 178 has an impulse response of $p_1(n)$ and low pass filter 180 has an impulse response of $p_0(n)$. The output of high pass filter 178 and low pass filter 180 are summed and fed to the next stage of the process as illustrated in FIG. 12.

As illustrated in FIG. 12, the output of the previous stage is input into low pass filter 186 after interpolation by interpolation block 182. Similarly, the coefficients from the high pass filter band wavelet decomposition process is fed into high pass filter 184 after interpolation by interpolation block 182. The process is then repeated at the next stage using interpolation blocks 188, high pass filter 190, and low pass 192. The final output is obtained by the sum of the final stage high pass filter and final stage low pass filter.

As previously indicated, the data compressor can use any wavelet transform. In one preferred embodiment, however, a Daubechies 12 wavelet filter is used. It is also presently preferred that a decomposition tree structure that mimics the psychoacoustic model be used. The inverse wavelet transform as illustrated by inverse wavelet transform block 174 in FIG. 11, must be matched to the wavelet transform used in the data compressor. Thus, in one preferred embodiment inverse wavelet transform 174 is a Daubechies 12 inverse wavelet filter. Table 2 below gives the coefficients for the high pass filter and low pass filter of the inverse wavelet transform.

TABLE 2

INVERSE DAUBECHIES 12 FILTER COEFFICIENTS

| LOW PASS FILTER | HIGH PASS FILTER |
| --- | --- |
| −1.077301085000 E−03 | −1.115407433500 E−01 |
| 4.777257511000 E−03 | 4.946238903980 E−01 |
| 5.538422010000 E−04 | −7.511339080210 E−01 |
| −3.158203931800 E−02 | 3.152503517090 E−01 |
| 2.752286553000 E−02 | 2.262646939650 E−01 |
| 9.750160558700 E−02 | −1.297668675670 E−01 |
| −1.297668675670 E−01 | −9.750160558700 E−02 |
| −2.262646939650 E−01 | 2.752286553000 E−02 |
| 3.152503517090 E−01 | 3.158203931800 E−02 |
| 7.511339080210 E−01 | 5.538422010000 E−04 |
| 4.946238903980 E−01 | −4.777257511000 E−03 |
| 1.115407433500 E−01 | −1.077301085000 E−03 |

Returning to FIG. 11, after inverse wavelet transform 174, a scaled reconstructed time domain signal results. This is illustrated in FIG. 11 by scaled reconstructed data frame 194. Scaled reconstructed data frame 194 is analogous to scaled input data frame 56 in FIG. 3. In other words, scaled reconstructed data frame 194 represents the reconstructed time domain signal except for any scaling which was done by data scaling block 54 in FIG. 3. In order to reverse the effects of data scaling block 54 in FIG. 3, scale reconstructed data frame 194 is passed through scaling block 196, which represents means for resealing inverse wavelet transformed data.

At this point, reconstructed data frame 198 represents the reconstructed digital audio data. Reconstructed data frame 198 is placed on to output data stream 199. Output data stream 199 may then be played using an appropriate device designed to convert digital audio data stream 199 to sound which can be heard by an individual.

The present invention may be embodied in other specific forms without departing from its spirit or essential characteristics. The described embodiments are to be considered in all respect only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for compressing digitally sampled audio data comprising the steps of:
   a) determining a desired average bit rate;
   b) performing a discrete wavelet transform on the digitally sampled data to obtain the resultant wavelet coefficients in such a manner that the resultant wavelet coefficients fall into critical bands that approximate a psychoacoustic model;
   c) calculating a control parameter related to the fractional percentage of wavelet coefficients which must be eliminated to achieve the desired average bit rate;
   d) using said control parameter to eliminate wavelet coefficients according to a predetermined criteria;
   e) quantizing the wavelet coefficients using a selected quantization level;
   f) entropy encoding the quantized coefficients; and
   g) feeding the number of bits used to represent the entropy encoded coefficients back into the calculation of the control parameter used to eliminate wavelet coefficients so that the desired average bit rate is achieved.

2. A method for compressing digitally sampled audio data as recited in claim 1 further comprising the step of computing a masking threshold of quantization noise for each of the critical bands.

3. A method for compressing digitally sampled audio data as recited in claim 2 where the computing a masking threshold of quantization noise comprises deriving from the digitally sampled audio data the power for each of the critical bands.

4. A method for compressing digitally sampled audio data as recited in claim 2 further comprises the step of computing a number of symbols for masking the quantization noise.

5. A method for compressing digitally sampled audio data as recited in claim 4 further comprising the step of using the control parameter to compute a quantity of symbol quantization bits.

6. A method for compressing digitally sampled audio data as recited in claim 5 further comprising the step of scaling the quantity of symbol quantization bits to achieve the desired bit rate.

7. A method for compressing digitally sampled audio data as recited in claim 5 the control parameter is used to restrict the quantity of symbol quantization bits when a maximum bit rate is exceeded.

8. A method for compressing digitally sampled audio data as recited in claim 5 further comprising the step of entropy encoding the quantity of symbol quantization bits.

9. A method for compressing digitally sampled audio data as recited in claim 5 wherein the quantizing the wavelet coefficients further comprises quantizing and entropy encoding a gain of each of the critical packets when the quantity of symbol quantization bits is greater than zero.

10. A method for compressing digitally sampled audio data as recited in claim 9 wherein the quantizing the wavelet coefficients further comprises scaling the wavelet coefficients of each of the critical packets by the gain of each of the critical packets.

11. A method for compressing digitally sampled audio data as recited in claim 10 wherein the quantizing the wavelet coefficients is performed using the quantity of symbol quantization bits.

12. A method for compressing digitally sampled audio data as recited in claim 1 wherein the entropy encoding comprises run length encoding.

13. A method for compressing digitally sampled audio data as recited in claim 1 wherein the entropy encoding comprises Huffman encoding.

14. A method for compressing digitally sampled audio data as recited in claim 1 wherein the entropy encoding comprises a combination of entropy encoding methods.

15. A method for compressing digitally sampled audio data as recited in claim 14 wherein the combination of entropy encoding methods comprises a combination of run length encoding and Huffman encoding.

16. A method for compressing digitally sampled audio data which has been divided into data frames containing a predefined number of digital audio data samples, the method comprising the steps of:
 a) performing a discrete wavelet transform on the data frame to obtain the corresponding wavelet coefficients;
 b) decomposing the resultant wavelet coefficients into critical bands that approximate a psychoacoustic model;
 c) calculating a control parameter used to eliminate wavelet coefficients in this frame in order to achieve a desired average bit rate;
 d) selecting a quantization level for the wavelet coefficients based on a psychoacoustic model which uses one or more parameters derived from the data in the data frame;
 e) quantizing the wavelet coefficients at the selected quantization level;
 f) entropy encoding the quantized wavelet coefficients; and
 g) feeding the number of bits used to represent the entropy encoded coefficients back into the calculation of the control parameter so that the desired average bit rate is achieved.

17. A method for compressing digitally sampled audio data as recited in claim 16 further comprising the step of computing a masking threshold of quantization noise for each of the critical bands.

18. A method for compressing digitally sampled audio data as recited in claim 17 where the computing a masking threshold of quantization noise comprises deriving from the digitally sampled audio data the power for each of the critical bands.

19. A method for compressing digitally sampled audio data as recited in claim 17 further comprising the step of computing a number of symbols for masking the quantization noise.

20. A method for compressing digitally sampled audio data as recited in claim 19 wherein the control parameter is used to compute a quantity of symbol quantization bits.

21. A method for compressing digitally sampled audio data as recited in claim 20 further comprising the step of scaling the quantity of symbol quantization bits to achieve the desired bit rate.

22. A method for compressing digitally sampled audio data as recited in claim 20 further comprising the step of restricting the quantity of symbol quantization bits when a maximum bit rate is exceeded.

23. A method for compressing digitally sampled audio data as recited in claim 20 further comprising the step of entropy encoding the quantity of symbol quantization bits.

24. A method for compressing digitally sampled audio data as recited in claim 20 wherein the quantizing the wavelet coefficients further comprises quantizing and entropy encoding a gain of each of the critical packets when the quantity of symbol quantization bits is greater than zero.

25. A method for compressing digitally sampled audio data as recited in claim 24 wherein the quantizing the wavelet coefficients further comprises scaling the wavelet coefficients of each of the critical packets by the gain of each of the critical packets.

26. A method for compressing digitally sampled audio data as recited in claim 25 wherein the scaling the wavelet coefficients comprises scaling the wavelet coefficients so they lie between $-1.0$ and $+1.0$.

27. A method for compressing digitally sampled audio data as recited in claim 25 wherein the quantizing the wavelet coefficients is performed using the quantity of symbol quantization bits.

28. A method of reconstructing digitally sampled audio information which has been previously compressed, the method comprising the steps of:
 a) entropy decoding the compressed digitally sampled audio information;
 b) decomposing the compressed digitally sampled audio information into critical bands that approximate a psychoacoustic model;
 c) performing an inverse discrete wavelet transform; and
 d) rescaling the transformed data into the time domain.

29. A method of reconstructing digitally sampled audio information which has been previously compressed as recited in claim 28 further comprising the step of decoding a number of quantization bits for each of the critical bands.

30. A method of reconstructing digitally sampled audio information which has been previously compressed as recited in claim 29 further comprising the step of when the number of quantization bits is greater than zero for each of the critical bands, decoding quantized coefficients.

31. A method of reconstructing digitally sampled audio information which has been previously compressed as recited in claim 30 further comprising the steps of:
 a) decoding a gain factor for each of the critical bands; and
 b) scaling the quantized coefficients of each of the critical bands by the gain factor prior to performing the inverse discrete wavelet transform.

32. An article of manufacture comprising:
 a) a computer usable medium having computer readable program code means embedded therein for compressing digitally sampled audio data, the computer readable program code means comprising:
  i) means for determining a desired average bit rate;
  ii) means for performing a discrete wavelet transform on the digitally sampled data to obtain the resultant wavelet coefficients in such a manner that the resultant wavelet coefficients fall into critical bands that approximate a psychoacoustic model;
  iii) means for calculating a control parameter used to eliminate symbols representing wavelet coefficients in order to achieve the desired average bit rate;
  iv) means for eliminating a plurality of wavelet coefficients according to a predetermined criteria;

v) means for quantizing the wavelet coefficients using a selected quantization level;

vi) means for entropy encoding the quantized coefficients; and vii) means for feeding the number of bits used to represent the entropy encoded coefficients back into the calculation of the control parameter in order to achieve the desired average bit rate.

33. An article of manufacture as recited in claim 32 further comprising means for computing a masking threshold of quantization noise for each of the critical bands.

34. An article of manufacture as recited in claim 33 where the means for computing a masking threshold of quantization noise comprises means for deriving from the digitally sampled audio data the power for each of the critical bands.

35. An article of manufacture as recited in claim 33 further comprising means for computing a number of symbols for masking the quantization noise.

36. An article of manufacture as recited in claim 35 further comprising means for computing a quantity of symbol quantization bits.

37. An article of manufacture as recited in claim 36 further comprising means for scaling the quantity of symbol quantization bits to achieve the desired bit rate.

38. An article of manufacture as recited in claim 36 further comprising means for restricting the quantity of symbol quantization bits when a maximum bit rate is exceeded.

39. An article of manufacture as recited in claim 36 further comprising means for entropy encoding the quantity of symbol quantization bits.

40. An article of manufacture as recited in claim 36 wherein the means for quantizing the wavelet coefficients further comprises means for quantizing and entropy encoding a gain of each of the critical packets when the quantity of symbol quantization bits is greater than zero.

41. An article of manufacture as recited in claim 40 wherein the means for quantizing the wavelet coefficients further comprises means for scaling the wavelet coefficients of each of the critical packets by the gain of each of the critical packets.

42. An article of manufacture as recited in claim 41 wherein the means for quantizing the wavelet coefficients is performed using the quantity of symbol quantization bits.

43. An article of manufacture as recited in claim 32 wherein the means for entropy encoding comprises means for run length encoding.

44. An article of manufacture as recited in claim 32 wherein the means for entropy encoding comprises Huffman encoding.

45. An article of manufacture as recited in claim 32 wherein the means for entropy encoding comprises a combination of entropy encoding methods.

46. An article of manufacture as recited in claim 45 wherein the combination of entropy encoding methods comprises a combination of run length encoding and Huffman encoding.

47. An article of manufacture comprising:
a) a computer usable medium having computer readable program code means embedded therein for compressing digitally sampled data, the computer readable program code means comprising:
i) means for dividing the data into data frames containing a predefined number of digital data samples;
ii) means for performing a discrete wavelet transform on the data frame to obtain the corresponding wavelet coefficients in such a manner that the wavelet coefficients fall into critical bands that approximate a psychoacoustic model;
iii) means for calculating a control parameter used to adjust the instantaneous bit rate in order to achieve a desired average bit rate;
iv) means for eliminating a plurality of wavelet coefficients according to a predefined criteria;
v) means for selecting a quantization level for the wavelet coefficients based on the psychoacoustic model which uses one or more parameters derived from the data in the data frame;
vi) means for quantizing the wavelet coefficients at the selected quantization level;
vii) means for entropy encoding the quantized wavelet coefficients; and
viii) means for feeding the number of bits used to represent the entropy encoded coefficients back into the calculation of the control parameter in order to achieve the desired average bit rate.

48. An article of manufacture as recited in claim 47 further comprising means for computing a masking threshold of quantization noise for each of the critical bands.

49. An article of manufacture as recited in claim 48 wherein the means for computing a masking threshold of quantization noise comprises means for deriving from the digitally sampled audio data the power for each of the critical bands.

50. An article of manufacture as recited in claim 48 further comprising means for computing a number of symbols for masking the quantization noise.

51. An article of manufacture as recited in claim 50 further comprising means for computing a quantity of symbol quantization bits.

52. An article of manufacture as recited in claim 51 further comprising means for scaling the quantity of symbol quantization bits to achieve the desired bit rate.

53. An article of manufacture as recited in claim 51 further comprising means for restricting the quantity of symbol quantization bits when a maximum bit rate is exceeded.

54. An article of manufacture as recited in claim 51 further comprising means for entropy encoding the quantity of symbol quantization bits.

55. An article of manufacture as recited in claim 51 wherein the means for quantizing the wavelet coefficients further comprises means for quantizing and entropy encoding a gain of each of the critical packets when the quantity of symbol quantization bits is greater than zero.

56. An article of manufacture as recited in claim 55 wherein the means for quantizing the wavelet coefficients further comprises means for scaling the wavelet coefficients of each of the critical packets by the gain of each of the critical packets.

57. An article of manufacture as recited in claim 56 wherein the means for scaling the wavelet coefficients comprises means for scaling the wavelet coefficients so they lie between −1.0 and +1.0.

58. An article of manufacture as recited in claim 56 wherein the quantizing the wavelet coefficients is performed using the quantity of symbol quantization bits.

59. An article of manufacture comprising:
a) a computer usable medium having computer readable code means embedded therein for reconstructing digitally sampled information which has been previously compressed, the computer readable code means comprising:
i) means for entropy decoding the compressed digitally sampled audio information to obtain entropy decoded information comprising wavelet coefficients;

ii) means for decomposing the compressed digitally sampled audio information into critical bands that approximate a psychoacoustic model;

iii) means for performing an inverse discrete wavelet transform on the entropy decoded information contained within the critical bands to obtain inverse wavelet transformed data; and iv) means for rescaling the inverse wavelet transformed data into the time domain.

60. An article of manufacture as recited in claim 59 further comprising a means for decoding a number of quantization bits for each of the critical bands.

61. An article of manufacturers recited in claim 60 further comprising a means for decoding quantized coefficients when the number of quantization bits is greater than zero for each of the critical bands.

62. A method for compressing digitally sampled audio data comprising the steps of:

determining a desired average bit rate;

performing a discrete wavelet transform on the digitally sampled data to obtain resultant wavelet coefficients in a plurality of wavelet bands;

selecting the number of bits that will be used to quantize the wavelet coefficients in said plurality of wavelet bands;

encoding the wavelet coefficients in each of said plurality of wavelet bands with an entropy encoder to obtain a plurality of individually encoded wavelet bands;

assembling the individually encoded wavelet bands into a single compressed output data frame; and feeding the number of bits used to represent the single compressed output data frame back into the selection of the number of bits used to quantize the wavelet coefficients in said plurality of wavelet bands.

63. A method for compressing digitally sampled audio data comprising the steps of:

performing a discrete wavelet transform on the digitally sampled data to obtain resultant wavelet coefficients in a plurality of wavelet bands;

selecting the number of bits that will be used to quantize the wavelet coefficients in said plurality of wavelet bands;

encoding the wavelet coefficients in each of said plurality of wavelet bands with an entropy encoder to obtain a plurality of individually encoded wavelet bands; and assembling the individually encoded wavelet bands into a single compressed output data frame.

64. A computer-readable medium having computer-executable instructions comprising:

means for performing a discrete wavelet transform on digitally sampled audio data to obtain the resultant wavelet coefficients in such a manner that the resultant wavelet coefficients fall into critical bands that approximate a psychoacoustic model of a human ear;

means for quantizing said wavelet coefficients to a selected quantization level, said means for quantizing being adapted to quantize the wavelet coefficients in each of said critical bands to obtain a plurality of quantized critical bands;

means for individually entropy encoding each of said plurality of quantized critical bands; and means for controlling the bit rate from said means for individually entropy encoding by controlling the selected quantization level based on the number of bits at the output of said means for individually entropy encoding.

65. A computer-readable medium having computer-executable instructions comprising:

means for performing a discrete wavelet transform on digitally sampled audio data to obtain the resultant wavelet coefficients in such a manner that the resultant wavelet coefficients fall into critical bands that approximate a psychoacoustic model of a human ear;

means for quantizing said wavelet coefficients to a selected quantization level, said means for quantizing being adapted to quantize the wavelet coefficients in each of said critical bands to obtain a plurality of quantized critical bands; and means for individually entropy encoding each of said plurality of quantized critical bands.

* * * * *